(12) United States Patent
Kramer

(10) Patent No.: US 8,566,750 B2
(45) Date of Patent: Oct. 22, 2013

(54) SYSTEM AND METHOD FOR SELECTING WEIGHTING FOR SEARCHING AND FOR PRESENTATION OF SEARCH RESULTS

(75) Inventor: Glenn A. Kramer, San Francisco, CA (US)

(73) Assignee: Bespoke Innovations SARL, Bellevue (CH)

( * ) Notice: Subject to any disclaimer, the term of this patent is extended or adjusted under 35 U.S.C. 154(b) by 1646 days.

(21) Appl. No.: 11/959,655

(22) Filed: Dec. 19, 2007

(65) Prior Publication Data

US 2009/0164948 A1 Jun. 25, 2009

(51) Int. Cl.
*G06F 3/048* (2013.01)

(52) U.S. Cl.
USPC ......................................................... 715/856

(58) Field of Classification Search
USPC .................................... 715/834, 856; 345/440
See application file for complete search history.

(56) References Cited

U.S. PATENT DOCUMENTS

| | | | | |
|---|---|---|---|---|
| 5,844,572 | A * | 12/1998 | Schott | 345/440 |
| 6,281,899 | B1 * | 8/2001 | Gould et al. | 715/848 |
| 7,079,711 | B2 * | 7/2006 | Labelle | 382/305 |
| 8,099,683 | B2 * | 1/2012 | Garbow et al. | 715/856 |
| 2003/0231213 | A1 * | 12/2003 | Gould et al. | 345/782 |
| 2004/0222987 | A1 * | 11/2004 | Chang et al. | 345/419 |
| 2005/0068320 | A1 * | 3/2005 | Jaeger | 345/440 |
| 2006/0224938 | A1 * | 10/2006 | Fikes et al. | 715/500 |
| 2008/0016467 | A1 * | 1/2008 | Chambers et al. | 715/835 |
| 2008/0079725 | A1 * | 4/2008 | Sagalov | 345/440 |
| 2008/0243787 | A1 * | 10/2008 | Stading | 707/3 |
| 2008/0243799 | A1 * | 10/2008 | Rozich et al. | 707/3 |
| 2008/0244429 | A1 * | 10/2008 | Stading | 715/764 |

* cited by examiner

*Primary Examiner* — William Bashore
*Assistant Examiner* — Hien Duong
(74) *Attorney, Agent, or Firm* — Young & Thompson

(57) ABSTRACT

Systems and methods for assigning weights to a plurality of objects are defined. Metrics associated with the objects are defined. A cursor is displayed and movement of the cursor is constrained by a control weight shape. Movement of the cursor within the control weight shape defines the weights assigned to the metrics. A display weight shape including a plurality of display weight factors is displayed. Each of the display weight factors corresponds to one of the metrics and their display corresponds to the weights assigned to the metrics.

25 Claims, 18 Drawing Sheets

SYSTEM AND METHOD FOR SELECTING WEIGHTING FOR SEARCHING AND FOR PRESENTATION OF SEARCH RESULTS

The section headings used herein are for organizational purposes only and are not to be construed as limiting the subject matter described in any way.

FIELD

The embodiments described herein relate generally to graphical user interfaces and more particularly to graphical user interfaces for presentation of search results according to weighted combination equations.

BACKGROUND

It is often desirable to express or view information based on a function of variables, such as a weighted combination. For example, in some applications, a list of objects may be presented in order of their importance, where their importance is determined by a weighted combination. In addition, specifying different weights may be useful when performing different types of analysis. For example, each of the variables may represent a particular property and the importance of each property may change depending on the analysis or the perspective of the individual carrying out the analysis. Moreover, in many applications, an abundance of information may be obtained by viewing and altering the weighting of each of the variables of the weighted combination and then viewing the resulting presentation of objects.

Factor analysis is an example of an application where it may be useful to adjust the weights that are applied to the variables of an equation. Factor analysis may be used to model behaviors as a linear combination of various factors. Generally, factor analysis is applied by using statistical techniques and linear algebra to compute not only the factor weightings, but also the axes of the factor space, which may differ from the measurement space. Using the techniques in reverse may also be useful. For example, given a known or hypothesized set of factors, one may manipulate the factor weightings to observe the resultant behavior as shown by a set of weighted observations. This technique allows one to become familiar with an information space by assigning more or less importance to certain factors.

In many applications, it may be desirable to specify a relationship between weights in a function. For example, it may be useful to constrain the sum of the weights to a constant value. In certain cases, it may also be desirable to specify further constraints on the values of the weights, beyond the value to which they sum.

Designers of graphical user interfaces (GUIs) employ a variety of controls or "widgets" to input or control numerical data, such as slider bars, wheels, and the like. Typically each of the numbers controlled by a single widget is treated independently. If there is a relationship between more than one variable, widgets such as sliders can be "ganged" and mutually constrained so that increasing one increases or decreases others, according to some relationship or formula. An example of ganged sliders is illustrated in FIG. 1. Specifically, FIG. 1 illustrates three sliders 102, 104, and 106. Each slider may be used to specify the value of a given variable or weight in a function and may be separately controlled.

SUMMARY

Systems and methods for assigning weights to a plurality of objects are defined. Metrics associated with the objects are defined. A cursor is displayed and movement of the cursor is constrained by a control weight shape. Movement of the cursor within the control weight shape defines the weights assigned to the metrics. A display weight shape including a plurality of display weight factors is displayed. Each of the display weight factors corresponds to one of the metrics and their display corresponds to the weights assigned to the metrics.

The embodiments described herein provide in one aspect, a method of presenting a set of objects. In various embodiments, a plurality of at least three metrics is associated with each of the objects. A metric factor is calculated for each combination of each of the metrics and each of the objects. A control weight shape having one less dimension than the number of metrics is selected. A cursor that is movable within the control weight shape is displayed. The cursor defines a point of convergence of a plurality of control factor shapes, wherein each of the control factor shapes corresponds to one of the metrics. A weight is determined for each metric based on the position of the cursor A display weight shape is displayed. The display weight shape has a plurality of display factor shapes; each of the display factor shapes corresponds to one of the metrics. In addition, the appearance of each display factor shape is indicative of the weight assigned to the corresponding metric. A weighted combination is determined for each of the objects based on the weights and the metric factors. A display of at least some of the objects is arranged based on weighted combinations.

In some embodiments, the control weight shape and the display weight shape are the same shape and wherein each of the control factor shapes corresponds to one of the display factor shapes, and wherein each of the corresponding control factor shapes and display factor shapes are the same shape.

In various embodiments, the control weight shape is displayed coincident with the display weight shape. For example, in some embodiments, the control weight shape may be displayed superimposed on top of the display weight shape. While, in other embodiments, the display weight shape may be displayed superimposed on top of the control weight shape.

In various embodiments, the control weight shape is not displayed. In various other embodiments, the control weight shape is displayed. In some embodiments, the control weight shape is displayed together with the display weight shape. In some other embodiments, the control weight shape is displayed apart from the display weight shape.

In some embodiments, there are three objects and three corresponding metrics, and the control weight shape is a triangle having three edges, each edge corresponding to one of the metrics.

In various embodiments, the display weight shape is a circle having a display factor shape corresponding to each of the metrics.

In some embodiments, the area of each of the display factor shapes corresponds to the weight of the corresponding metric. In various other embodiments, the volume of each of the display factor shapes corresponds to the weight of the corresponding metric.

In various embodiments, the color of each of the display factor shapes corresponds to the weight of the corresponding metric. In some embodiments, the intensity of each of the display factor shapes corresponds to the weight of the corresponding metric.

The embodiments described herein provide in another aspect, a method of presenting a set of objects. In various embodiments, three metrics are associated with each of the objects. A metric factor is calculated for each combination of each of the metrics and each of the objects. A cursor that is movable within a control weight triangle is displayed. The cursor defines a point of convergence of three control factor triangles. Each of the control factor triangles corresponds to one of the metrics. A weight is determined for each metric based on the position of the cursor. A display weight triangle is displayed. The display weight triangle has three display factor triangles; each of the display factor triangles corresponds to one of the metrics. In addition, the area of each display factor triangles corresponds to the weight assigned to the corresponding metric. A weighted combination is determined for each of the objects based on the weights and the metric factors. A display of at least some of the objects is arranged based on weighted combinations.

In some embodiments, the control weight triangle and the display weight triangle are identical and the control weight triangle is displayed coincidentally with the display weight triangle. In some embodiments, the control weight triangle is displayed superimposed on the display weight triangle. In some other embodiments, the display weight triangle is displayed superimposed on the control weight triangle. In addition, the display factor triangles converge at a point defined by the cursor.

In some embodiments, each side of the display weight triangle forms a base of one of the display factor triangles. In various embodiments, the base of a display factor triangle is the side of the display factor triangle that does change in length, orientation and/or position. In various embodiments, each of the two sides of the factor triangle that are not the base can change in length, orientation, and/or position.

In various embodiments, the color of each of the display factor triangles corresponds to the weight of the corresponding metric. In some embodiments, the intensity of each of the display factor triangles corresponds to the weight of the corresponding metric.

The embodiments described herein provide in another aspect, a method of presenting a set of objects. Four metrics are associated with each of the objects. A metric factor is calculated for each combination of each of the metrics and each of the objects. A cursor that is movable within a control weight tetrahedron is displayed. The cursor defines a point of convergence of three control factor tetrahedrons. Each of the control factor tetrahedrons corresponds to one of the metrics. A weight is determined for each metric based on the position of the cursor. A display weight shape is displayed. The display weight shape has four display factor shapes; each of the display factor shapes corresponds to one of the metrics. In addition, the appearance of each display factor shapes corresponds to the weight assigned to the corresponding metric. A weighted combination is determined for each of the objects based on the weights and the metric factors. A display of at least some of the objects is arranged based on weighted combinations.

In some embodiments, the display weight shape is a display weight tetrahedron and wherein the display factor shapes are display factor tetrahedrons and wherein each surface of the display weight tetrahedron forms a base of one of the display factor tetrahedrons. In various embodiments, the base of a display factor tetrahedron is the surface of the display factor triangle that does change in area, orientation and/or position. In various embodiments, each of the two sides of the factor triangle that are not the base can change in length, orientation, and/or position. In various embodiments, each of the three surfaces of the factor tetrahedron that are not the base can change in area, orientation, and/or position.

In various embodiments, the display weight shape is a display weight circle and wherein the display factor shapes are display factor sectors.

In some embodiments, the color of each of the display factor shapes corresponds to the weight of the corresponding metric. In some embodiments, the intensity of each of the display factor shapes corresponds to the weight of the corresponding metric.

The embodiments described herein provide in another aspect, a method of controlling weights assigned to a set of at least three metrics. The method comprises manipulating the position of a cursor within a control weight shape that is displayed on a computing device. The control weight shape includes a plurality of the control factor shapes; each of the control factor shapes corresponds to one of the metrics. In addition, the control factor shapes converge at a position defined by the cursor.

In some embodiments, a set of objects is defined. In addition, in various embodiments, each of the metrics is associated with each of the objects prior to the step of manipulating the cursor.

In some embodiments, the set of metrics is defined. For example, the set of metrics may be defined by a user. In some other embodiments, the set of metrics are predefined.

BRIEF DESCRIPTION OF THE DRAWINGS

The skilled person in the art will understand that the drawings, described below, are for illustration purposes only. The drawings are not intended to limit the scope of the applicant's teachings in any way.

For a better understanding of the embodiments and to show more clearly how they may be carried into effect, reference will now be made, by way of example only, to the accompanying drawings, in which.

Figure 1:
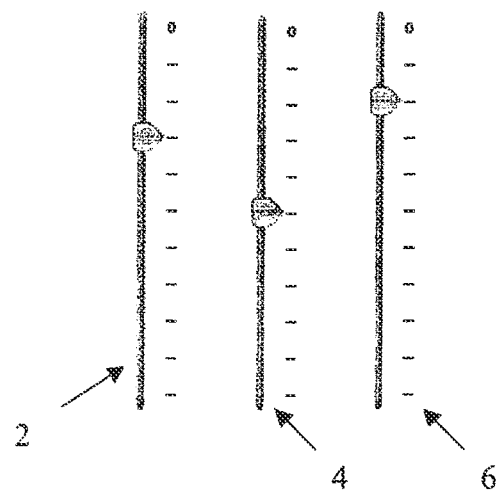
FIG. 1 is a schematic diagram of 3 slider bars.

For simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. Some embodiments may be implemented in computer programs executing on programmable computers each comprising at least one processor, a data storage system (including volatile and non-volatile memory and/or other storage elements), at least one input device, and at least one output device. For example and without limitation, the programmable computers may be a personal computer, laptop, server, personal data assistant, and cellular telephone. Program code is applied to input data to perform the functions described herein and generate output information. The output information is applied to one or more output devices, in known fashion.

Each program may be implemented in a high level procedural or object oriented programming and/or scripting language to communicate with a computer system. In some embodiments, the programs may be implemented in whole or in part using assembly or machine language. The language may be a compiled or interpreted language. Each such computer program may be stored on a storage media or a device (e.g. ROM or magnetic diskette) readable by a general or special purpose programmable computer, for configuring and operating the computer when the storage media or device is read by the computer to perform the procedures described herein. The inventive system may be implemented as a computer-readable storage medium configured with a computer program, where the storage medium so configured causes or may be used to cause a computer to operate in a specific and predefined manner to perform the functions described herein.

Furthermore, the system, processes and methods of the described embodiments may be distributed in a computer program product comprising a computer readable medium that has embodied thereon computer usable instructions for one or more processors. The medium may be provided in various forms, including one or more diskettes, compact disks, tapes, chips, wireline transmissions, satellite transmissions, Internet transmissions or downloadable files or objects, magnetic and electronic storage media, digital and analog signals, and the like. The computer useable instructions may also be provided in various forms, including compiled and non-compiled code.

The embodiments described herein relate to systems and methods of presenting a display of a set of objects based on their relevance as determined by the values of multi-variable functions that correspond to each of the objects, as well as of manipulating the display. To this end the described embodiments provide user interactive graphical function composition interfaces that allow for the display and input of weights that correspond to each of the variables of the equation.

The embodiments described herein allow a user of the system and methods to manipulate the display of the objects by adjusting the weights that are applied in the weighted combinations. Several of the embodiments described herein make this possible by displaying a selectable and adjustable graphical function composition interface. The graphical function composition interface allows a user to both view and specify the relative weights of the equation. In some embodiments, the graphical function composition interface is a weight shape. The weight shape is divided into factor shapes, the relative area or volume of each the factor shapes corresponds to a weight in a weighted combination equation, which may be for example but is not limited to a weighted sum equation. In various embodiments, the sum of the areas or volumes of the factor shapes are constrained to sum to the area or volume of the weight shape. Therefore, given that in various embodiments, the weights correspond to the factor areas, those embodiments constrain the weights to sum to a constant value.

In some embodiments, by displaying the relative weights in terms of areas and volumes, the weight shape (and its factor shapes) provides an intuitive display of the relative weights of that are applied to the variables of the weighted combination. Consequently, the user is able to easily see what the relative values of the weights are. In addition, in some embodiments, the weight shape provides the user an easy way of manipulating the relative values of the weights. Moreover, the weight shape provides immediate feedback to the user regarding the current values of weights for each of the variables in the function. In addition, the embodiments described herein, through the weight shape, provide a way of constraining the sum of the weights to a constant value regardless of the manner in which the user manipulates the weight shape.

In various embodiments, the system and method make use of a weight shape that is displayed to represent the weightings of the various metrics. As explained above, the weight shape is divided into several non-overlapping factor shapes. All the factor shapes converge at a point inside the weight shape. The vertices of the factor shapes are defined by the point of convergence and the vertices of the weight shape. This will be explained in greater detail below.

If the weight shape is two-dimensional, then the areas of the factor shapes sum to the area of the weight shape. Similarly, if the weight shape has greater than 2 dimensions then the volumes of the factor shapes sum to the volume of the weight shape.

Each factor shape is associated with a metric. The area or volume of the factor shape corresponds to the weight given to the variable that represents the associated metric. The variable may be referred to as a metric factor. More specifically, in various embodiments, the area or volume of a factor shape is proportional to the weight given to the corresponding metric factor.

In addition, as mentioned above, in various embodiments, the weight shape is interactive and allows the user to adjust the weighting scheme. This may be accomplished by displaying a cursor inside the weight shape that represents the point of convergence of each of the factor shapes. This allows the user to change the relative area or volume of each of the factor shapes and thereby change the relative weight applied to each of the metric factors.

In various embodiments, the weight shape is used to constrain the weights of the weighted combination to a constant sum. In some embodiments, the constant sum is 1. In contrast to other systems and methods, such as those that may use ganged sliders 2, 4, and 6 of FIG. 1, the weight shape can provide an intuitive way of constraining the sum. In the case where each of the sliders 2, 4, and 6 represents a weight and the sum of the weights is constrained, the movements of the sliders 2, 4, and 6 of FIG. 1 are not intuitive. For example, if one of the weights is increased it is not clear how the others should be decreased. In contrast, the cursor of these embodiments represents a point that is common to all the factor shapes and therefore moving the cursor causes the areas of the factor shapes to change in a way that is easy to see. The areas or volumes of each of the factor shapes add up to the area or volume of the weight shape. Thus, by setting the weights to be proportional to the areas or volumes of the factor shapes the sum of the weights can be constrained to a constant sum.

In some embodiments, the factor shapes will correspond to each of the variables in an equation. In other embodiments, the factor shapes may correspond to a subset of the variables in the equations. Thus, the values of the weights of some of the other variables may be controlled separately from the weight shape. For example, there may be five variables and only three of them may be controlled by the weight shape, while two may be fixed in value or otherwise controlled.

In various embodiments, it may be desirable that the user be able to select all possible non-negative values of weights that add up to the particular constant sum. In order for this to be possible, the weight shape should be selected to allow all possible values of factor areas or factor volumes to occur. In other words, points of convergence must exist that allow all possible combinations of values of each of the factor areas or volumes.

For example, if there are three metrics for which weights are desired then a triangle can be used as the weight shape. A point within a weight triangle taken together with the vertices of the weight triangle defines three factor triangles, with the internal point being the point of convergence. In addition, all possible values of factor areas are possible. Factor triangles will be discussed in greater detail below.

When there are four metrics a tetrahedron may be used. In the case of a weight tetrahedron, a point inside the weight tetrahedron can serve as a point of convergence for four factor tetrahedrons. In addition, it is possible to adjust the point of convergence to achieve all possible values of factor volumes. Factor tetrahedrons will be discussed below.

Figure 2:
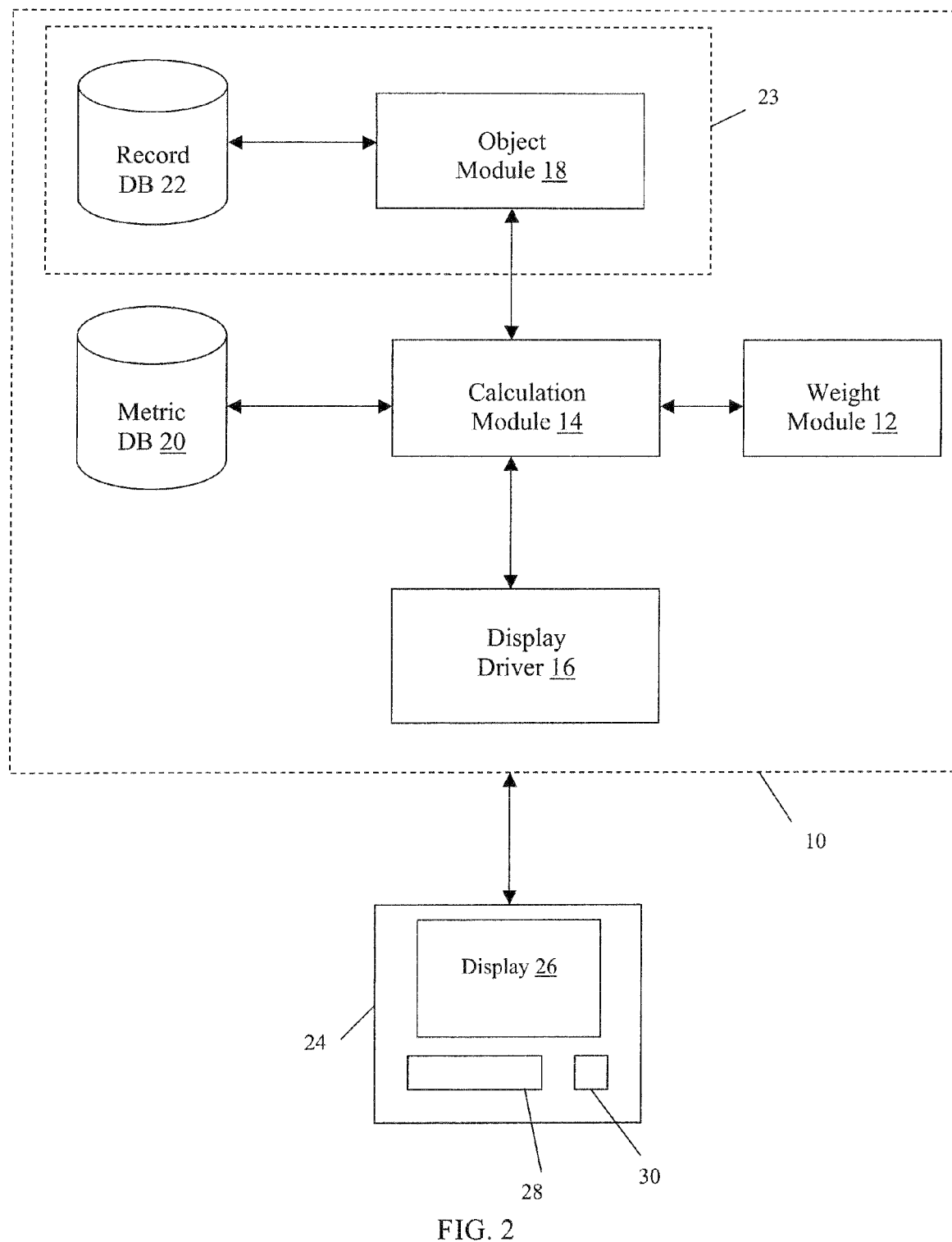
FIG. 2 is a block diagram of an exemplarily embodiment of a graphical function composition system.

Reference is now made to FIG. 2, which illustrates an exemplary embodiment of a graphical function composition system 10. Graphical function composition system 10 includes a weighting module 12, a calculation module 14, a display driver 16, an object module 18, a metric database 20, and a record database 22. Optionally, graphical composition system 10 may include a server 23.

As discussed above, it should be understood that graphical function composition system 10 may be implemented in hardware or software or a combination of both. Specifically, the modules of graphical function composition system 10 are preferably implemented in computer programs executing on a programmable computer, comprising at least one processor, a data storage system and at least one input and at least one output device. Without limitation the programmable computer may be a mainframe computer, server, personal computer, laptop, personal data assistant or cellular telephone. In some embodiments, graphical function composition system 10 is implemented in software and installed on a computing device, such as on the hard drive of a user workstation 24 and on a server 23, such that user workstation 24 interoperates with the server in a client-server configuration. In some embodiments, communication between the user workstation 24 and the server may occur via a wide area network (WAN), such as through the Internet. In other embodiments, the graphical function composition system 10 can run from a single dedicated workstation.

User workstation 24 includes a display 26 and input devices such as a keyboard 28 and a user-pointing device 30 (e.g. mouse). It should be understood that user workstation 24 may be implemented by any wired or wireless personal computing device with input and display means (e.g. conventional personal computer, laptop computing device, personal digital assistant (PDA), wireless communication device, etc.). User workstation 24 allows a user of the system to view information outputted by the system on display 26. As described above, in one exemplary embodiment, graphical function composition system 10 is preferably installed on the hard drive of user workstation 24 and on server 23, such that user workstation 24 interoperates with server 23 in a client-server configuration.

Figure 3:
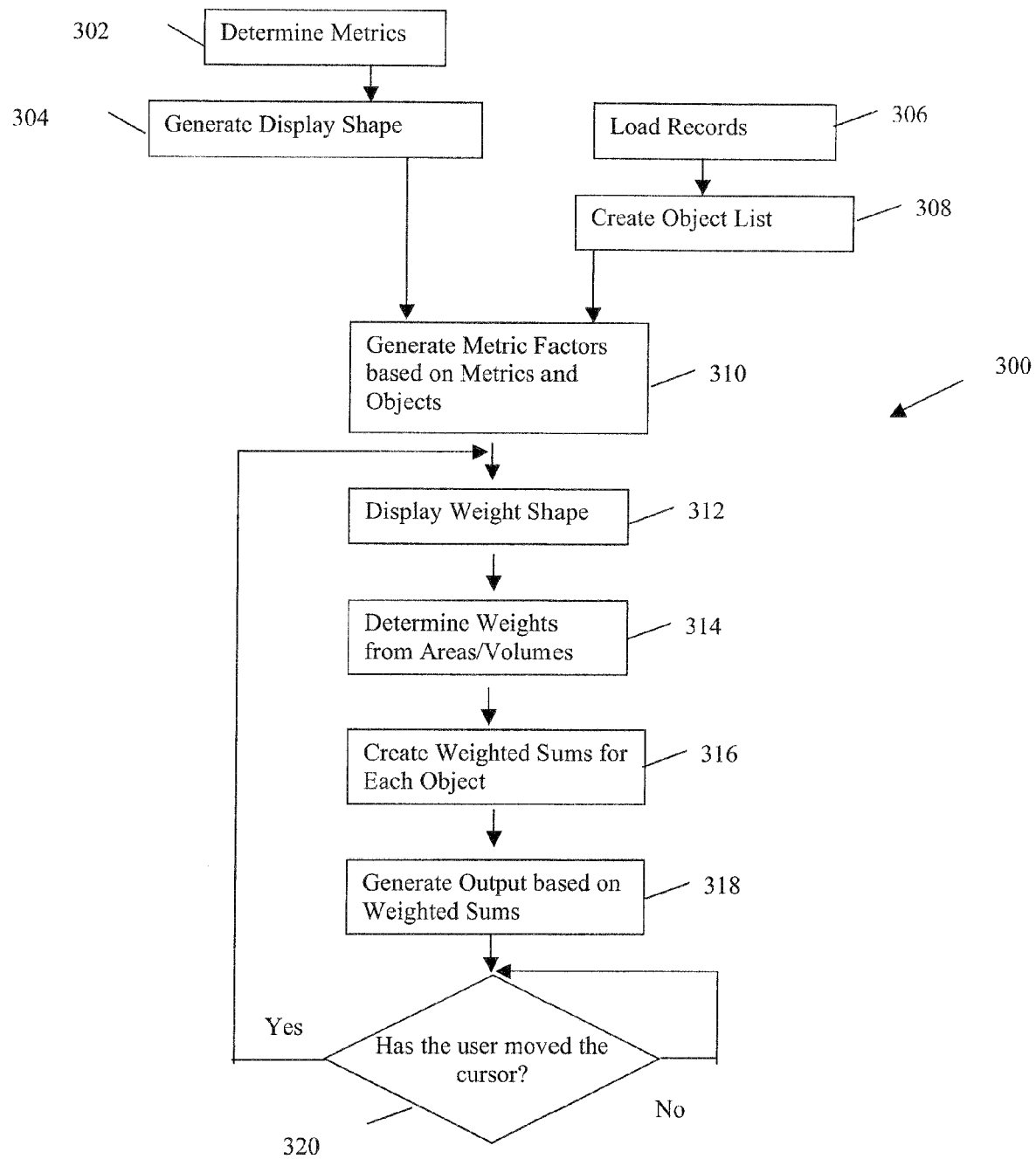
FIG. 3 is a flowchart diagram of an example set of operational steps executed by the graphical function composition system of FIG. 2.

Reference is now made to FIG. 3, which is a flowchart diagram that illustrates the basic operational steps 300 performed by graphical function composition system 10.

At step 302, the number of metrics is determined. In addition, the particular metrics are specified. The metrics are then stored in metric database 20. In some embodiments, the number of metrics may be fixed. In other embodiments, the user may be given the option of selecting the number of metrics. Similarly, in some embodiments, the particular metrics that are used may be pre-specified. This may for example be the case where an embodiment of graphical function composition system 10 is used for a very specific purpose. In other embodiments, the user may be given the option to specify the particular metrics that he/she would like to use. In such embodiments, the user may utilize input devices 28 or 30 of user workstation 24 to specify the metrics.

At step 304, an appropriate weight shape is generated by weight module 12 based at least in part on the number of metrics. The particular type of weight shape used is dependent on the number metrics. For example, if there are three metrics that graphical function composition system 10 makes use of a triangle may be an appropriate weight shape. On the other hand, if there are four metrics, then a regular tetrahedron may be used as a weight shape. For a greater number of metrics, shapes with a greater number of dimensions may be used and they may be represented by projections in lower dimensions.

At step 306, records are acquired from record database 22. The records may be any appropriate records. These records may for example be stored in a database. For example, but not limited to, in some embodiments the records may be web pages from the Internet that are downloaded based on a search using a search engine and stored in record database 22. In other embodiments, the records could be text documents that are stored in a record database 22 as part of a collection of documents on specific topics.

At step 308, a list of objects is generated by object module 18 based on the records. Each object may be associated with one or more records. For example, in an embodiment in which the records are web pages, an object can be a domain name, or a company that owns or operates the domain name.

At this step, records may be grouped together by object module 18. For example, in embodiments in which the records are web pages, the web pages may be grouped together based on their domains. In such embodiments, the web pages are considered to be the individual records and the domains are the objects. In other embodiments, it is possible for objects and records to be one in the same.

At step 310, metric factors are generated based on the metrics selected at step 302 and also based on the objects. Specifically, each of the objects is analyzed at this step based on the metrics. Based on the analysis, a metric factor is generated for each combination of metric and object. The metric factor is a variable, the value of which reflects a measure of an object's characteristics. The metric factors are used to construct an equation, such as a weighted combination, for each of the objects. Examples of metrics include, but are not limited to: (a) word order or word proximity, if the objects describe text documents, and (b) price or measures of search engine optimization if the objects describe electronic commerce sites.

At step 312, the weight shape is displayed. In various embodiments as part of the display, a cursor is used to indicate the point of convergence. As described above, the point of convergence is used along with the vertices of the weight shape, to define a set of non-overlapping factor shapes within the weight shape. The areas or volumes of the factor shapes sum to the total area or volume of the weight shape area or volume. If the weight shape is two-dimensional then areas are used. If the weight shape is three-dimensional or higher, then volumes are utilized.

In various embodiments, the user may change the position of the cursor by for example using user-pointing device 30 to move the cursor and thereby alter the relative areas or volumes of the factor shapes. Each of the factor shapes is associated with a particular metric. Therefore, the weight shape has as many factor shapes as there are metrics.

At step 314, weight module 12 determines the weights from the areas or volumes of each of the factor shapes. Each of these weights is associated with a metric. Specifically, the weight is associated with the same metric as the factor shape. The area or volume may be determined in any appropriate manner, as will be discussed in greater detail below.

At step 316, calculation module 14 determines the weighted combinations for each object. The weighted combinations are determined based on the metric factors determined at step 310 and the weights determined at step 314. Any appropriate equations may be used. For example, in some embodiments, the weighted combinations are linear combinations. In other embodiments, transformations to other spaces, such as for example a logarithmic space may be employed or other functions such as multiplicative combinations can be used. In yet other embodiments, equations based on fuzzy logic may be used provided that a deterministic outcome is specified.

At step 318, a display of the objects is generated based on the weighted combinations and displayed on display 26 of user workstation 24. In some embodiments, the display may comprise an ordered listing of the most relevant objects as determined by the weighted combinations calculated at step 316. Other embodiments may display objects as bar charts, colored points on a map, or any other graphical means of depicting relative rank.

At step 320, it is determined whether the user has altered the display and thereby changed the weights. If not, step 320 is repeated and the current display is not changed. On the other hand, if the user has altered the weights by, for example, moving the cursor that represents the point of convergence, then step 312 is repeated.

In various embodiments, the user is able to jump back to various steps by entering appropriate commands. For example, the user may wish to jump back to step 302 and specify a new set of metrics.

Figure 4:
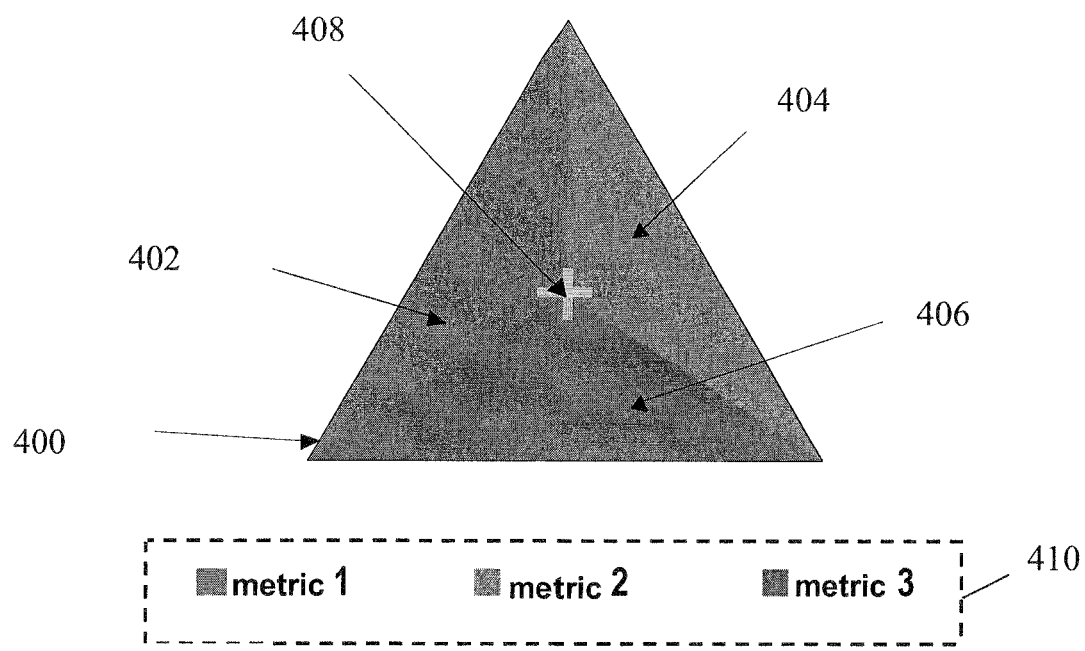
FIG. 4 is a schematic diagram of a first exemplary two-dimensional weight shape according to various embodiments.

Reference is now made to FIG. 4, which illustrates an exemplary weight shape 400 according to various embodiments. Weight shape 400 is an equilateral triangular and may be referred to as a weight triangle. However, it should be understood that it is not intended to exclude other embodiments in which the weight shape is not an equilateral triangle. Weight shape 400 may be used when there are three metrics of interest.

Weight shape 400 comprises three factor shapes 402, 404, and 406. Factor shapes 402, 404, and 406, which may be referred to as factor triangles, are triangles that converge at the point of convergence as defined by cursor 408. In some embodiments, each of the factor triangles may have a different color, pattern, or shading. In various embodiments, the position of cursor 408 may be altered by the user through the use of user pointing device 30. For example, the user may use a mouse to drag the cursor within the weight shape. This allows the user to alter the relative areas of the triangles and thereby the relative weights for the weighted combination. In addition, weight shape 400 may also be presented with a legend 410 that indicates which factor shape corresponds to which metric.

In FIG. 4 each of the factor shapes is illustrated as having an equal area. Therefore, for embodiments in which the sum of the weights is constrained to be equal to one, the corresponding weight of each metric would be approximately 0.333.

As mentioned above, it is not intended to exclude embodiments in which the weight shape is not an equilateral triangle. In some embodiments, one or two of the sides may be made longer than the third side. This may for example represent a pre-weighting of the factor triangles, such that when the cursor is in the central region of the triangle one or two of the variables will have a larger weighting than the third.

Figure 5:
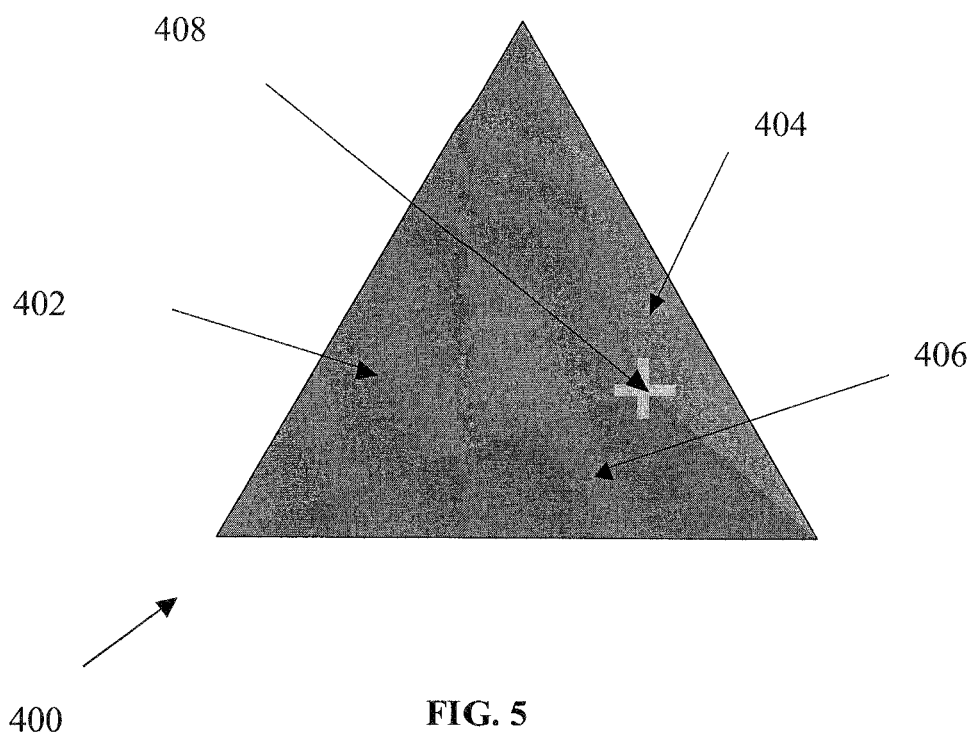
FIG. 5 is a schematic diagram of the weight shape of FIG. 4 having a second set of factor shape areas.

Reference is now made to FIG. 5, which illustrates the weight shape 400 with the cursor in a different position than in FIG. 4. In FIG. 5, factor shape 402 has a much bigger area than in the example in FIG. 4, while factor shapes 404 and 406 have smaller areas. Thus, in a corresponding weighted combination, the metric associated with factor shape 402 would have the largest weight, while the metric associated with factor shape 404 would have the smallest weight.

Figure 6:
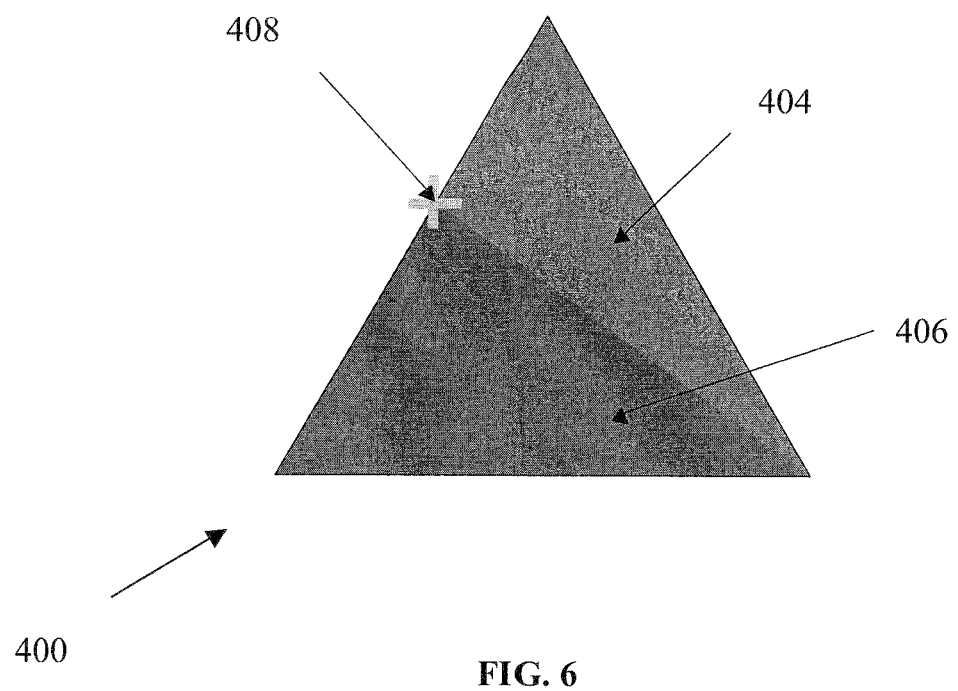
FIG. 6 is a schematic diagram of the weight shape of FIG. 4 having a third set of factor shape areas.

In various embodiments, the point of convergence and therefore the cursor is constrained to remain inside the weight shape. However, as used herein the term "a point inside the weight shape" includes a point on the perimeter of the shape. Reference is now made to FIG. 6, which illustrates the weight shape 400 of FIGS. 4 and 5, with the cursor 408 at a different position. Specifically, cursor 408 is at the left edge (on the perimeter) of weight shape 400. Consequently, factor shape 402 has an area of zero, while each of factor shapes 404 and 406 have areas greater than zero. Thus, in a weighted combination, the weight for the metric associated with factor shape 402 would be 0, while the other two weights would be non-zero and would sum to 1.

Optionally, the cursor may be positioned at a vertex of the weight shape 400 such that the areas of two factor shapes are zero while the area of the third factor shape is equal to the area of the weight shape. When the cursor is placed at a vertex of weight triangle, for example, the cursor is on two edges of the weight triangle, reducing the area of the factor triangles corresponding to the two edges to zero.

Figure 7:
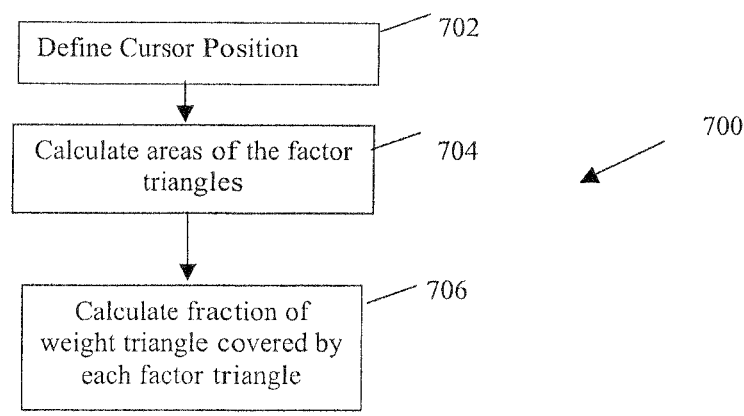
FIG. 7 is a flowchart of an exemplary set of steps taken by various embodiments of graphical function composition system 10 when calculating the areas of factor triangles.

Reference is now made to FIG. 7, which is a flowchart of an exemplary set of steps taken by various embodiments of graphical function composition system 10 when calculating the areas of factor triangles. The following description assumes that the weight shape is a triangle. In addition, the following description is illustrative only. Any appropriate method may be used for calculating the areas.

At step 702, the position of the cursor (and therefore the point of convergence) is defined In addition, the position of each of the vertices is also defined. For example, but not limited to, each position may be defined by x and y coordinates. For example, the point of convergence may be defined as $p=(x_p, y_p)$.

At step 704, the area of each of the factor triangles is calculated.

At step 706, the fraction of the weight triangle covered by each factor triangle is calculated.

Figure 8:
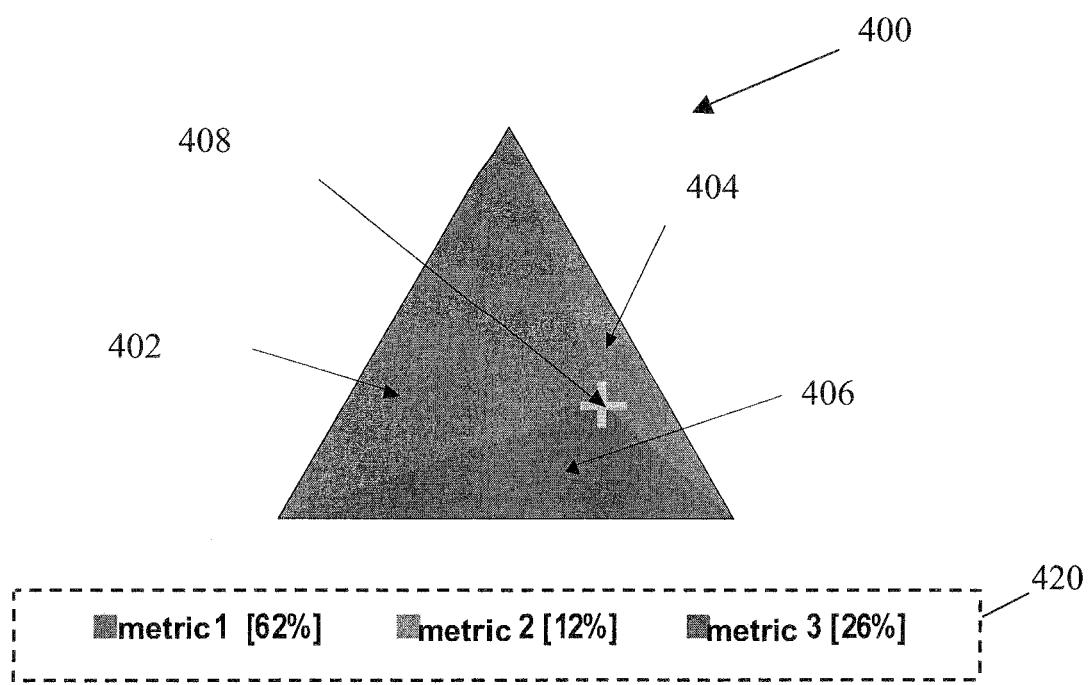
FIG. 8 is a schematic diagram of the weight shape of FIG. 5 incorporating a numerical display.

Reference is now made to FIG. 8, which illustrates weight triangle 400, with cursor 408 in the same position as in FIG. 5. However, FIG. 8 also includes a numerical display 420 that displays the relative area of each of the three factor triangles. As can be seen from numerical display 420, factor triangle 402 comprises 62% of the area of weight triangle 400, while factor triangles 404 and 406 are 12% and 26% of the area of factor triangle respectively. Thus if the corresponding metric factors are constrained to sum to 1, then the metric factors corresponding to the areas of factor triangles 402, 404, and 406 would be 0.62, 0.12, and 0.26 respectively.

By moving the cursor to various locations the user is able to assign different weights to each of the metric factors, while having immediate feedback with respect to the values of each of the weights.

Figure 9:
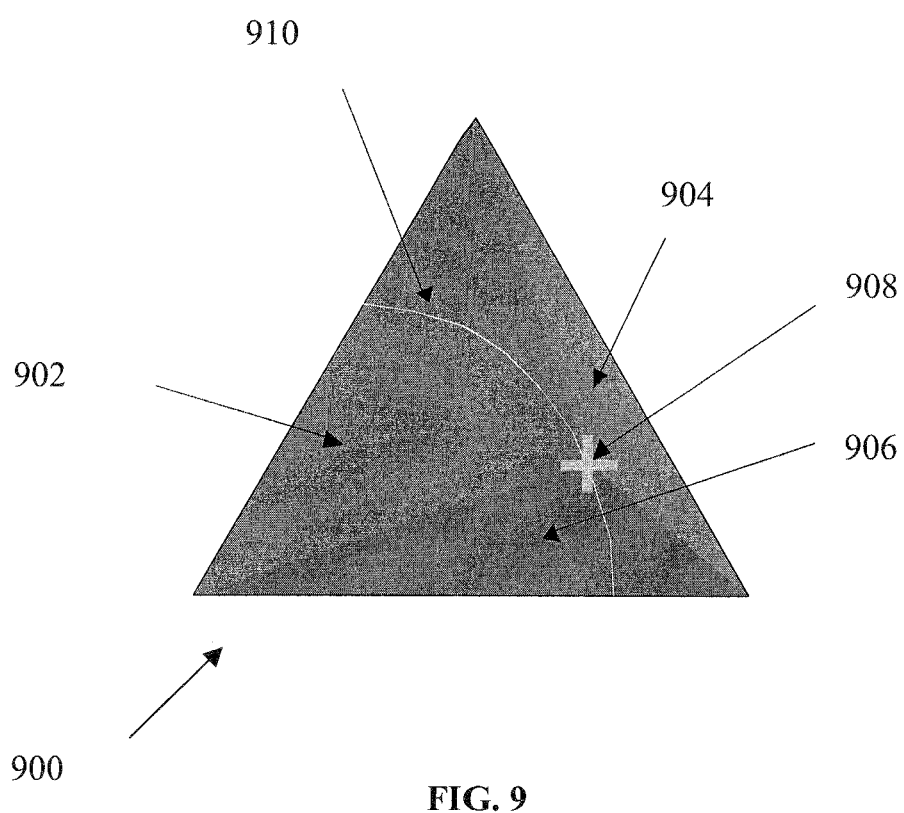
FIG. 9 is a schematic diagram of an exemplary two-dimensional weight shape according to various embodiments incorporating a constraint curve.

Reference is now made to FIG. 9. FIG. 9 illustrates a weight shape 900 that is similar to weight shape 400, in that it is a weight triangle that comprises factor shapes 902, 904 and 905, each of which is a factor triangle, and cursor 908. However, weight shape 900 also comprises a constraint curve 910. A constraint curve defines all the possible positions that cursor 908 may occupy and thereby constrains the values of the weights to a specific set. Thus, in addition, to constraining the sum of the weights to a fixed value, it is possible to utilize a weight shape to place further constraints on the weights of a weighted combination.

A constraint curve may be any curve that defines a set of all permissible positions of cursor 910 for a particular scenario or condition, and therefore the set of all possible points of convergence in that scenario or condition. This in turn specifies all the various possible values for the areas of each of the factor curves and thereby specifies all the various possible values for the weights. In the example illustrated in FIG. 9, constraint curve 910 is a simple curve. In general, constraints defined as different geometric shape may be applied. For example, a constraint may be in the form of line. Optionally, the line may be parallel to one side of the weight triangle, limiting the factor triangle based on that side of the weight triangle to a constant area. In other embodiments, the constraint may be an area, allowing the cursor be moved to any point within the area. In other embodiments, the constraint could a combination of areas, lines and curves. Furthermore, in embodiments in which a weight shape has greater than 2 dimensions, constraints may also be or may include surfaces and volumes.

Figure 10:
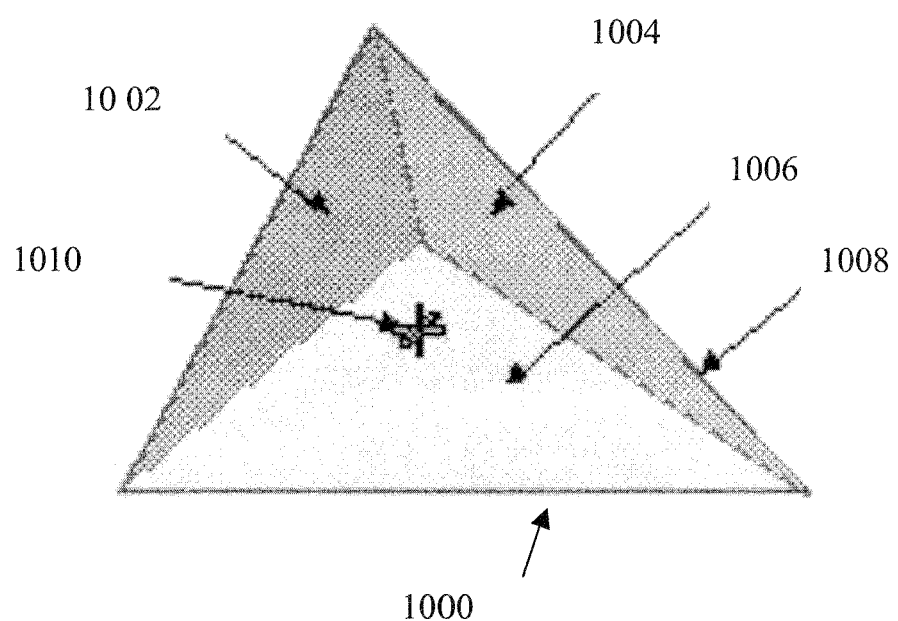
FIG. 10 is a schematic diagram of an exemplary three-dimensional weight shape according to various embodiments.

Reference is now made to FIG. 10, which illustrates a three-dimensional weight shape 1000. Weight shape 1000 is a regular tetrahedron and comprises four factor shapes 1002, 1004, 1006, and 1008, each of which is a tetrahedron. However, in other embodiments, weight tetrahedrons need not be regular tetrahedrons. Weight shape 1000 also comprises a cursor 1010. Cursor 1010 marks the point of convergence of each of the four tetrahedrons. Weight tetrahedron 1000 may be displayed as a three dimensional object that a user may rotate. In other embodiments, the weight tetrahedron 1000 may be alternatively or additionally be displayed as a set of two-dimensional projections. For example, four two-dimensional projections may be displayed. Each of the projections shows the tetrahedron projected onto one of its sides.

Weight shape 1000 may be used when there are four metrics of interest. A user may move cursor 1010 and thereby alter the relative volumes of each of the factor tetrahedrons 1002, 1004, 1006, and 1008. Each of the volumes is associated with a metric. Thus, the relative volumes of each of the tetrahedrons can be utilized to calculate weights for each of the associated metrics.

If it is desirable to create weighted combinations with greater than four metrics, then one may utilize shapes that have greater than 3 dimensions and utilize projections to illustrate these shapes in lower dimensions.

In various embodiments, graphical function composition system 10 may be used to data mine web pages for particular types of information. In one such illustrative example, graphical function composition system 10 may be used to analyze web pages that appear to sell gray market goods. The analysis may be performed in order to determine the relevance of particular web pages or domains based on several metrics. In such an embodiment, the objects may comprise domain names or the company names of the companies that are responsible for operating the web pages. Furthermore, the weighted combinations may represent the value of the relevance each of the domains or companies. Thus, the display of objects may be an ordered listing of some number of the domain names or company names that represent the highest relevance levels, as determined by the weighed sum.

In embodiments of graphical function composition system 10 that are used for data mining web pages, the record database 22 and the object module 18 may reside on a server 23, whereas the other modules may reside on the user workstation 26. In some embodiments, a browser on the user workstation 26 may be used to display the weight shape and the display of objects. In other embodiments, metric database 20 may reside on the server 23 as well. This may for example be the case where the metrics are unlikely to be altered by the user of the graphical function composition system 10. Server 23 may be operated by a legal entity, such as a company or corporation, that may charge users to interact with the server.

Figure 11:
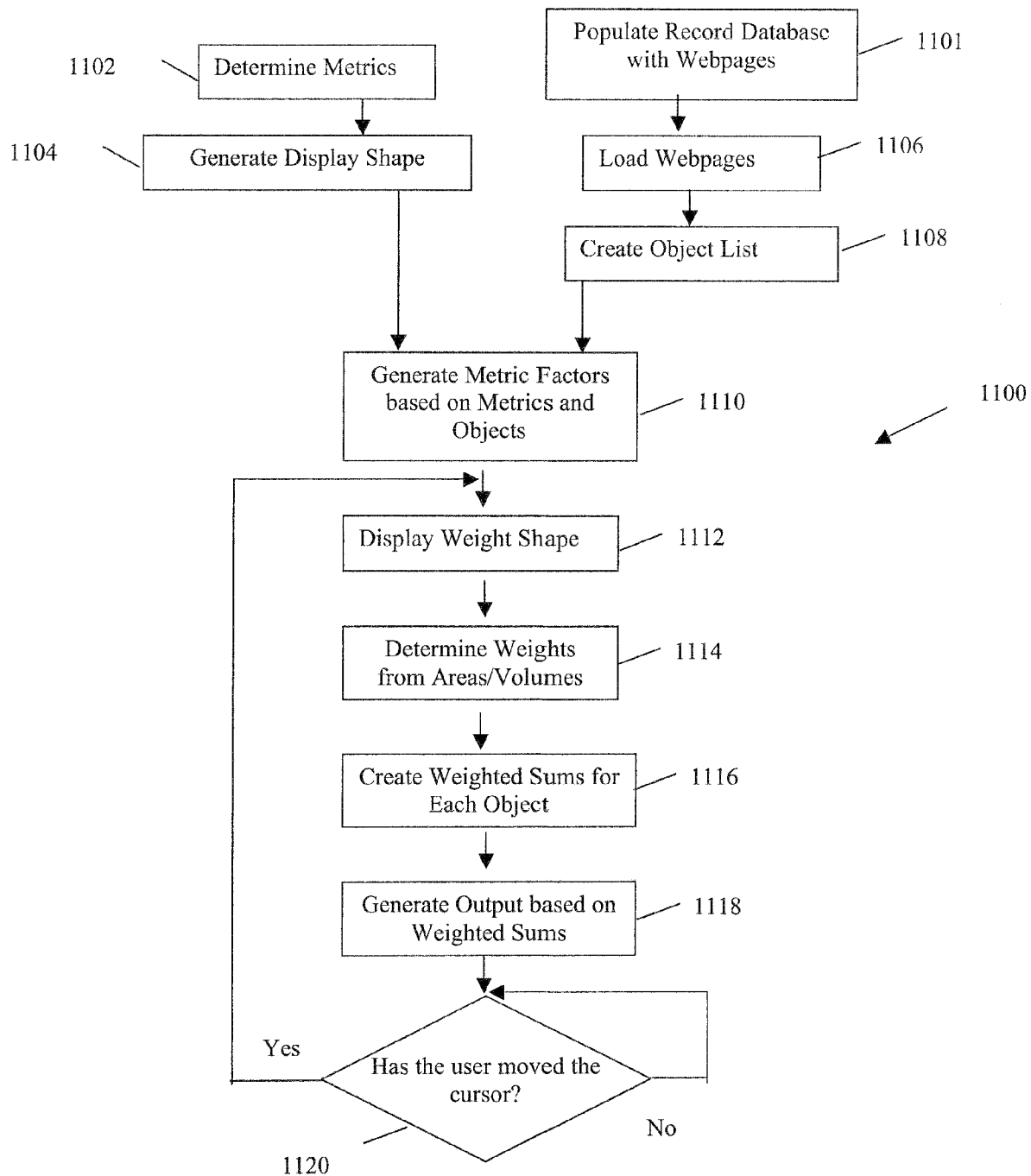
FIG. 11 is a flowchart diagram of an example set of operational steps executed by the graphical function composition system of FIG. 2 when used to data mine web pages for gray market goods.

Reference is now made to FIG. 11, which illustrates the basic operational steps performed by an embodiment of graphical function composition system 10 used to data mine web pages for gray market goods.

At step 1101, the record database is populated with web pages that sell gray market goods. As an alternative to populating the record database 22 with the web pages, record database 22 may be populated with portions of the web pages or records that reflect some of the information contained on the web pages. This step may be achieved by performing a search for the gray market goods using any appropriate search engine. The search may be performed using appropriate key words or stock keeping units (SKUs) for the goods. The web pages found by the search may be analyzed for evidence of ecommerce by for example determining whether the web page includes a button such as a sell button or add to cart button. The web pages that are determined to be relevant may then be stored in the record database.

At step 1102 the metrics are specified. In some embodiments, the user is given the opportunity to specify both the number of metrics and what the specific metrics are. In other embodiments, the number of metrics is fixed and the user may specify what specific metrics are to be used. In yet other embodiments the number and specific metrics may be predetermined by for example, an entity operating the server 23 and offering users the use of graphical function composition system 10 as a paid service.

Examples of metrics which may be specified at this step include but are not limited to, the number of SKUs offered by the web pages, the number of brands offered by the web pages, the price delta, which is the discount at which the gray market good is offered when compared to the regular price of the good, and the search engine optimization of the web pages.

At step 1104, an appropriate weight shape is displayed based at least in part on the number of metrics. In embodiments, where the number of metrics is never altered this step may comprise creating the same weight shape regardless of user input.

At step 1106, the web pages or records stored in record database 22 are loaded and analyzed.

At step 1108, a list of object instances is created by the object module 18 based on the analysis performed at step 1106. For example, the web pages loaded at step 1106 may be grouped according to the domain name and the object list may comprise the resulting list of domain names. In the case where graphical function composition system 10 is used to analyses relevance levels of the web pages or domains, each domain entry in the list may be referred to as a relevance object instance.

At step 1110, calculation module 14 generates metric factors based on the metrics and the actual objects. For example, if one metric is search engine optimization, then at this step calculation module 14 generates a factor that represents the optimization of the web pages that belong to the domain. In various embodiments, for each domain, calculation module 14 generates an array of metric factors, where each metric factor corresponds to a metric.

At step 1112, the weight module 10 and display driver 16 cooperate to display a weight shape. In some embodiments, the default weight shape comprises weight factors have an even area or volume.

At step 1114, calculation module 14 determines appropriate weights based on the factor shapes displayed in the weight shape.

At step 1116, calculation module 14 creates weighted combinations for each of the domains. These weighted combinations are created based on (i) the weights determined at step 1114 and (ii) the metric factors determined at step 1110.

At step 1118, a display of at least a portion of the objects is generated and displayed on the display of user workstation 24. In some embodiments, the display may comprise an ordered listing of the most relevant domains. The relevance of the domains may be determined by the value of the weighted combinations that were calculated at step 1116.

At step 1120, it is determined whether the user has manipulated the weight shape so as to alter the relative areas or volumes of the factor shapes. If not, then step 1120 is repeated. If so, then step 1112 is repeated.

In various embodiments, the user is able to jump back to various steps by entering appropriate commands. For example, the user may wish to jump back to step 1102 and specify a new set of metrics.

Figure 12:
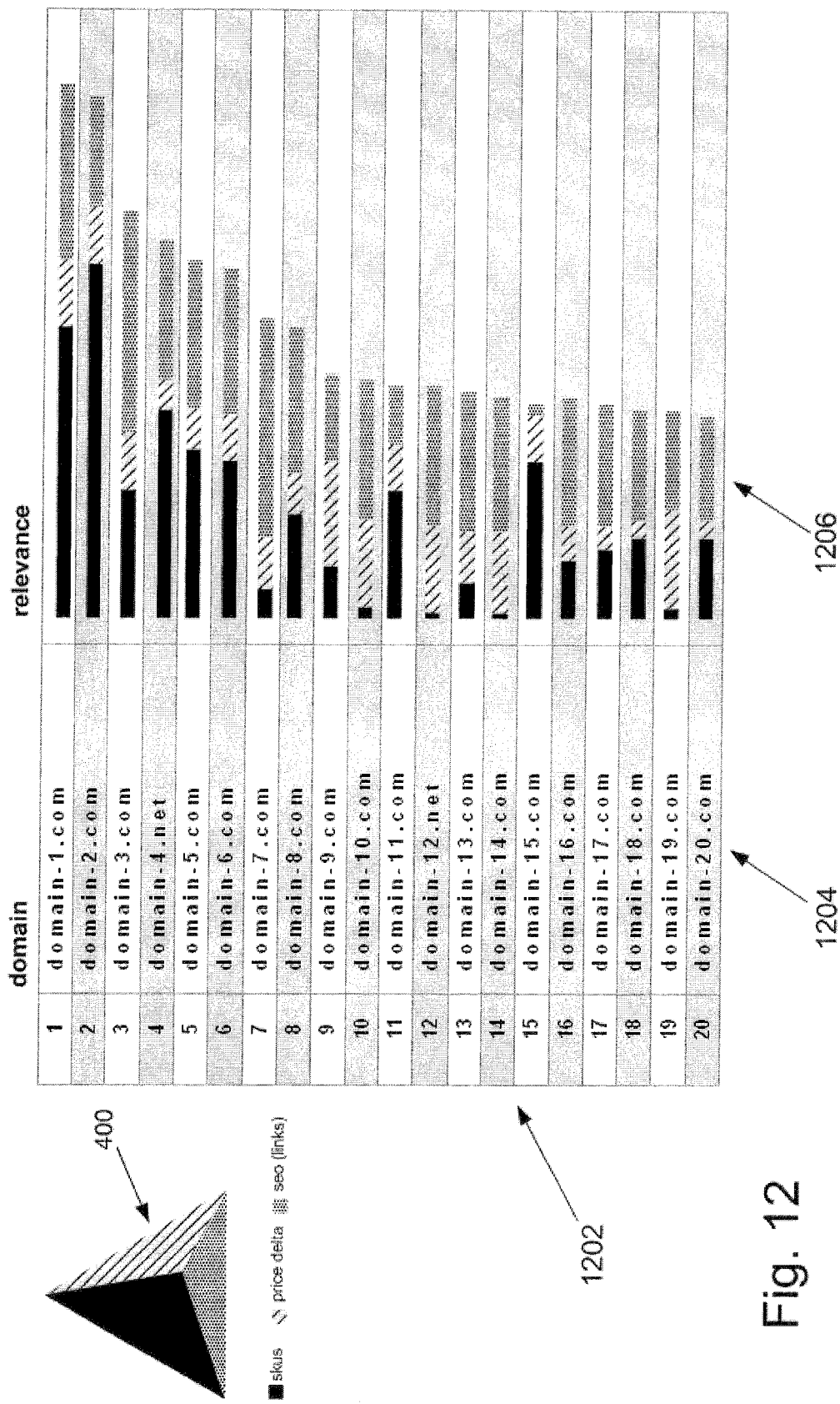
FIG. 12 is a schematic diagram of an exemplary output of the graphical function composition system of FIG. 2.

Reference is next made to FIG. 12, which illustrates a portion of an exemplary output of display 26 of user workstation 24. The output comprises a weight shape 400 as well as a display 1202 of some of the objects. Display 1202 includes a list 1204 of the 20 most relevant objects as determined by the weighted combination. Display 1202 also includes a corresponding bar chart 1206 of the weighted combination associated with the object.

In the case where domains are examined for the likelihood that they offer gray market goods for sale, the bar chart 1206 indicates a comparative level of their relevance. Optionally, the bars may be color coded with one color representing each metric. The bars can show the contribution of each metric to an overall relevance level. In various embodiments, the colors on the bars will match those of the factor shape thereby providing the user with immediate feedback regarding each of the object's strengths and weaknesses with respect to the three metrics. Bar charts encompass one embodiment but should not be construed as limiting in any way. Other embodiments may contain maps, pie charts, etc., depending upon the kind of data being displayed.

In various embodiments graphical function composition system 10 may be used to present the results of a database keyword search. In some embodiments, this may be an Internet keyword search. More specifically, graphical function composition system 10 may be used to present a listing of the most relevant documents as determined by a corresponding set of equations of weighted combinations, each of which relates to a document. In those embodiments, in which the keyword search is of the Internet, the documents can be web pages. The weight shape allows the user to manipulate the relative weighting of metrics and thereby obtain different orderings of the documents as their relevance may change. Examples of metrics may include, but are not limited to, the number of keyword terms matched, the order that the keyword terms appear in the document, and the proximity of the keywords to one another within the document.

Figure 13:
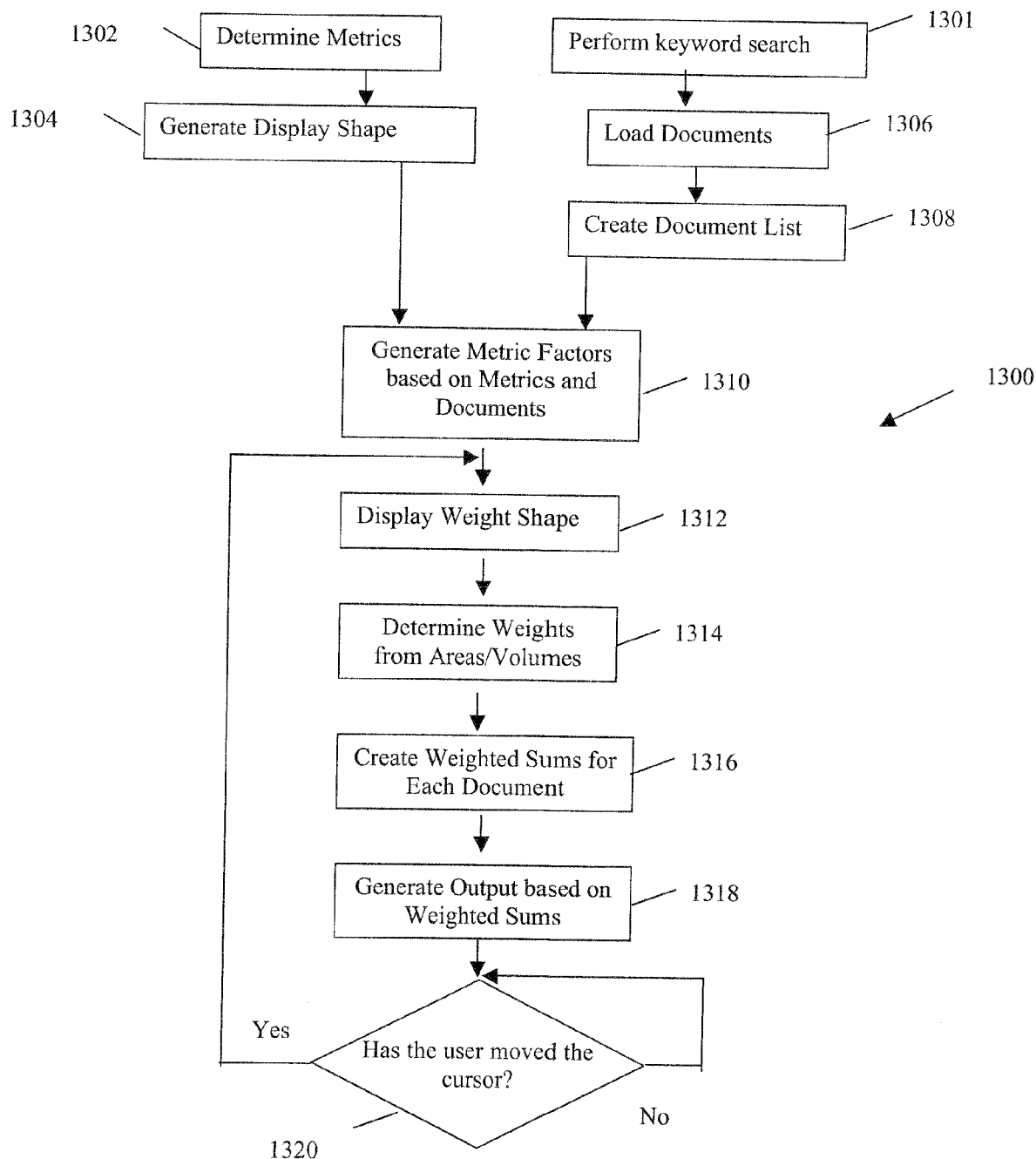
FIG. 13 is a flowchart diagram of an example set of operational steps executed by the graphical function composition system of FIG. 2 when used to rank documents based on keyword searching.

Reference is now made to FIG. 13, which illustrates the basic operational steps performed by various embodiments of graphical function composition system 10 used to present the result of a keyword search. The keyword search may be any appropriate keyword search, including but not limited to, a search of web pages on the Internet or text documents stored in a database. In the following description the term document will be used to refer to any appropriate document that may be searched using a keyword search including, but not limited to, web pages and text documents.

At step 1301, the keyword search is performed. In some embodiments, this may comprise utilizing a search engine to perform an Internet keyword search and then populating the record database with the web pages or records of the web pages that were identified by the keyword search. In other embodiments, this step may comprise performing a keyword search of text documents in the database.

At step 1302 the metrics are specified. In some embodiments, the user is given the opportunity to specify both the number of metrics and what the specific metrics are. In other embodiments, the number of metrics is fixed and the user may specify what specific metrics are to be used. In yet other embodiments the number and specific metrics may be predetermined by for example, an entity operating the server 23 and offering users the use of graphical function composition system 10 as a paid service.

As mentioned above, examples of metrics may include, but are not limited to, the number of keyword terms matched, the order that the keyword terms appear in the document, and the proximity of the keywords within the document.

At step 1304, an appropriate weight shape is displayed based, at least in part, on the number of metrics. In embodiments where the number of metrics is never altered, this step may comprise creating the same weight shape regardless of user input.

At step 1306, the documents or records that are stored in record database 22 and that were identified in the keyword search are loaded and analyzed.

At step 1308, a list of documents is created by the object module 18 based on the analysis performed at step 1306. For example, the list may comprise a listing of the document titles.

At step 1310, calculation module 14 generates metric factors based on the metrics and the actual objects. For example, if one metric is the order in which the keywords appear, then at this step calculation module 14 generates a factor that represents the order in which the keywords appear relative to the order specified at step 1302. In various embodiments, for each domain, calculation module 14 generates an array of metric factors, where each metric factor corresponds to a metric.

At step 1312, the weight module 10 and display driver 16 cooperate to display a weight shape. In some embodiments, the default weight shape comprises weight factors have an even area or volume.

At step 1314, calculation module 14 determines appropriate weights based on the factor shapes displayed in the weight shape.

At step 1316, calculation module 14 creates weighted combinations for each of the documents. These weighted combinations are created based on (i) the weights determined at step 1114 and (ii) the metric factors determined at step 1110.

Ate step 1318, a display of at least a portion of the objects is generated and displayed on the display of user workstation 24. In some embodiments, the display may comprise an ordered listing of the most relevant documents. The relevance of the documents may be determined by the value of the weighted combinations calculated at step 1116.

At step 1320, it is determined whether the user has manipulated the weight shape so as to alter the relative areas or volumes of the factor shapes. If not, then step 1320 is repeated. If yes, then step 1312 is repeated.

In various embodiments, the user is able to jump back to various steps by entering appropriate commands. For example the user may wish to jump back to step 1302 and specify a new set of metrics.

Reference is again made to FIG. 4. Weight shape 400 serves both a control function and a display function in this embodiment. The weight shape 400 is used in combination with cursor 408 to control the weights assigned to metrics associated with each of the factor shapes 402-406. The resulting weights are illustrated in weight shape 400 by factor shapes 402. The factor shapes 402-406 converge at the point where the cursor 408 is positioned, allowing a user to observe the effects of moving the cursor 408 on the weights assigned to the different metrics. The weight shape thus serves as both a control weight shape and as a display weight shape. As a control weight shape, the weight shape 400 is used in combination with cursor 408 to define the weights assigned to metrics. As a display weight shape, the factor shapes 402-406 of control shape 400 are used to display the assigned weights relative to one another. In other embodiments, a separate control weight shape and display weight shape may be used to control and display the weights assigned to metrics.

Figure 14:
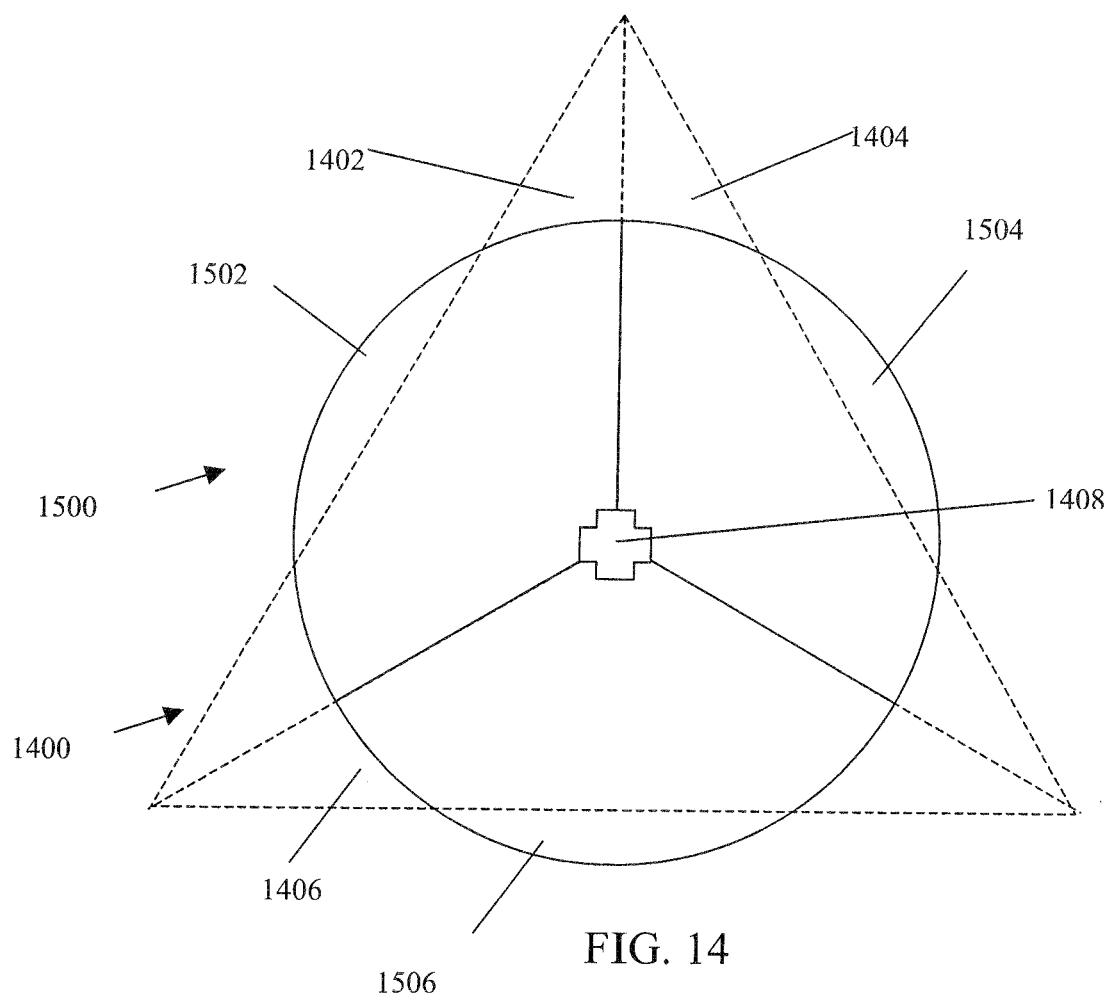
FIG. 14 is a schematic diagram of a first exemplary two-dimensional control weight shape and an exemplary two-dimensional display weight shape according to various embodiments.

Reference is now made to FIG. 14, which illustrates a method in which the relative color intensity or area of factor shapes within a display weight shape may be controlled using a control weight shape. FIG. 14 illustrates a control weight shape 1400 and a display weight shape 1500. In this example, the control weight shape 1400 is a triangle with the same shape as weight shape 400 of FIG. 4.

Control weight shape 1400 has three control factor shapes 1402, 1404 and 1406. Each of the control factor shapes is linked to one display factor shapes 1502, 1504 or 1506 of the display weight shape 1500: control factor shape 1402 is linked to display factor shape 1502; control factor shape 1404 is linked to display factor shape 1504 and control factor shape 1406 is linked to display factor shape 1506.

Cursor 1408 is linked to control weight shape 1400. In FIG. 14, control weight shape 1400 is illustrated in FIG. 14 with dashed lines. In this example, some parts of the control weight shape extend beyond the perimeter of the display weight shape. In other embodiments, the control weight shape may be entirely within the display weight shape or the display weight shape may be entirely within the control weight shape.

As cursor 1408 is moved, the areas of the control factor shapes is varied, as has been described in relation to the factor shapes 402-406 of weight shape 400 (FIG. 4). In some embodiments, control weight shape 1400 may optionally not be displayed to the user. In such an embodiment, the control factor shapes 1402-1406 are also not displayed, but the area of the shapes is calculated and is used to control the size or color intensity of the display factor shapes 1502, 1504 and 1506 of factor weight shape 1500.

Any appropriate correlation of the control factor shapes and the factor shape of the weight shape may be used. For example, if the control weight shape 1400 and the display weight shape have the same area (or volume in the case of a 3 or greater dimension shapes), then the display factor shapes 1502-1506 may displayed having an area equal to the calculated area of the corresponding control factor shape. In other embodiments, other mappings, functions or correlations may be used. The correlations between the area of the control factor shapes and display factor shapes need not be linear. For example, a logarithmic correlation may be used. In other embodiments, a quadratic, quartic or higher order correlation may be used. In other embodiments, different mappings, functions or correlations may be used to relate different control factor shapes to their corresponding display factor shapes. A value is calculated for each of the display factor shapes using the correlation and the area (or volume) of each display factor shape is displayed corresponding to the proportion of the area (or volume) of the particular display factor shape relative to the total area (or volume) of all of the display factor shapes.

By varying the position of the cursor 1408 within control weight shape 1400, the area of the display factor shapes 1502-1506 may be varied from zero to the full area of the display weight shape.

In this embodiment, the control weight shape 1400 and the display weight shape 1500 are calculated to have the same area (within a given numerical precision). Each display factor shape is displayed with an area equal to the area of the corresponding control factor shape.

Figure 15:
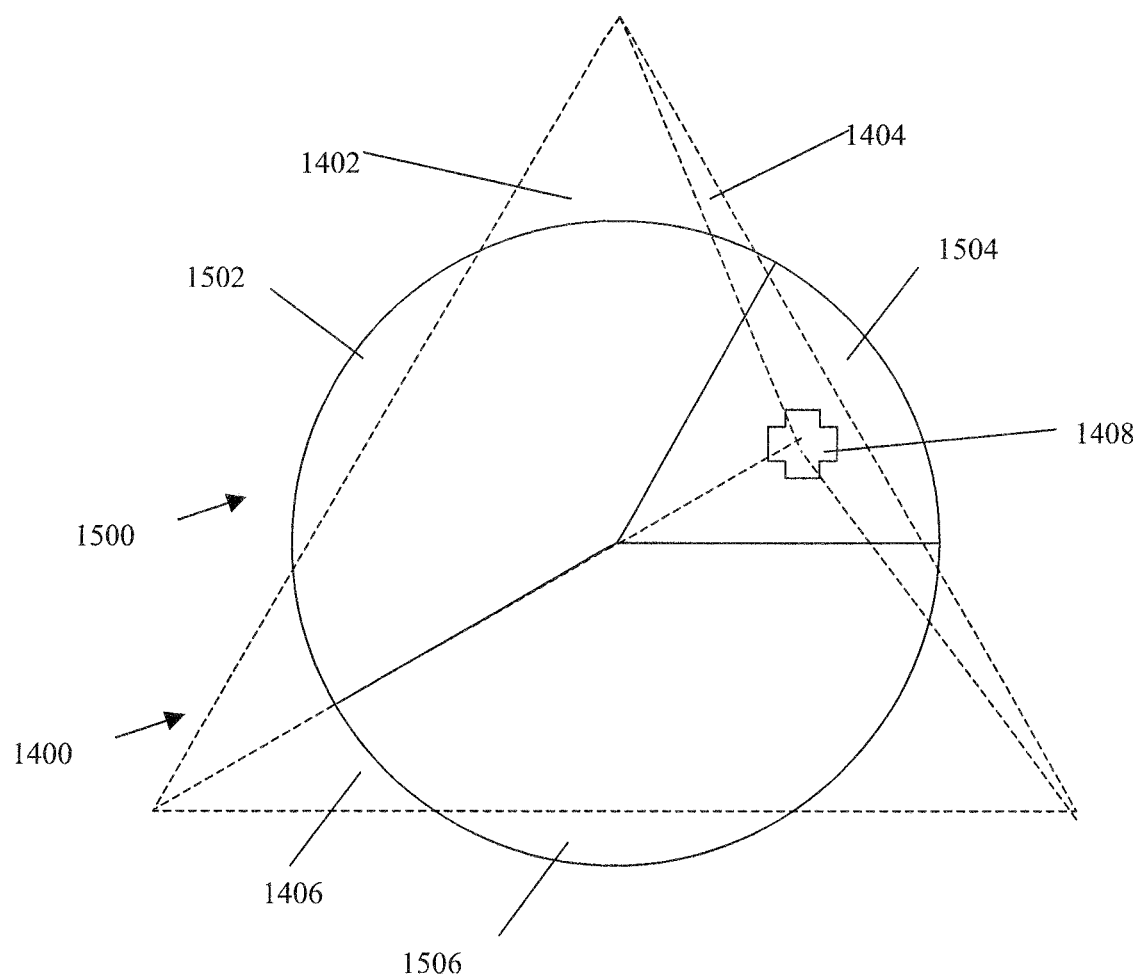
FIG. 15 is a schematic diagram of the control weight shape and display weight shape of FIG. 14 having a second set of control factor shape areas and display factor shape areas.

Reference is now made to FIG. 15, which illustrates cursor 1408 positioned away from the center of control weight shape 1400. With the cursor 1408 at the illustrated position, control factor shapes 1402 and 1406 have a relatively large area and the corresponding display factor shapes have a 1502 and 1506 also have a relatively large area. Control factor shape 1404 has a relatively smaller area and the corresponding display factor shape 1504 has a corresponding relatively small area. A user is thus able to control the relative areas of the display factor shapes and visually observe the weights assigned to the corresponding metrics.

Figure 16:
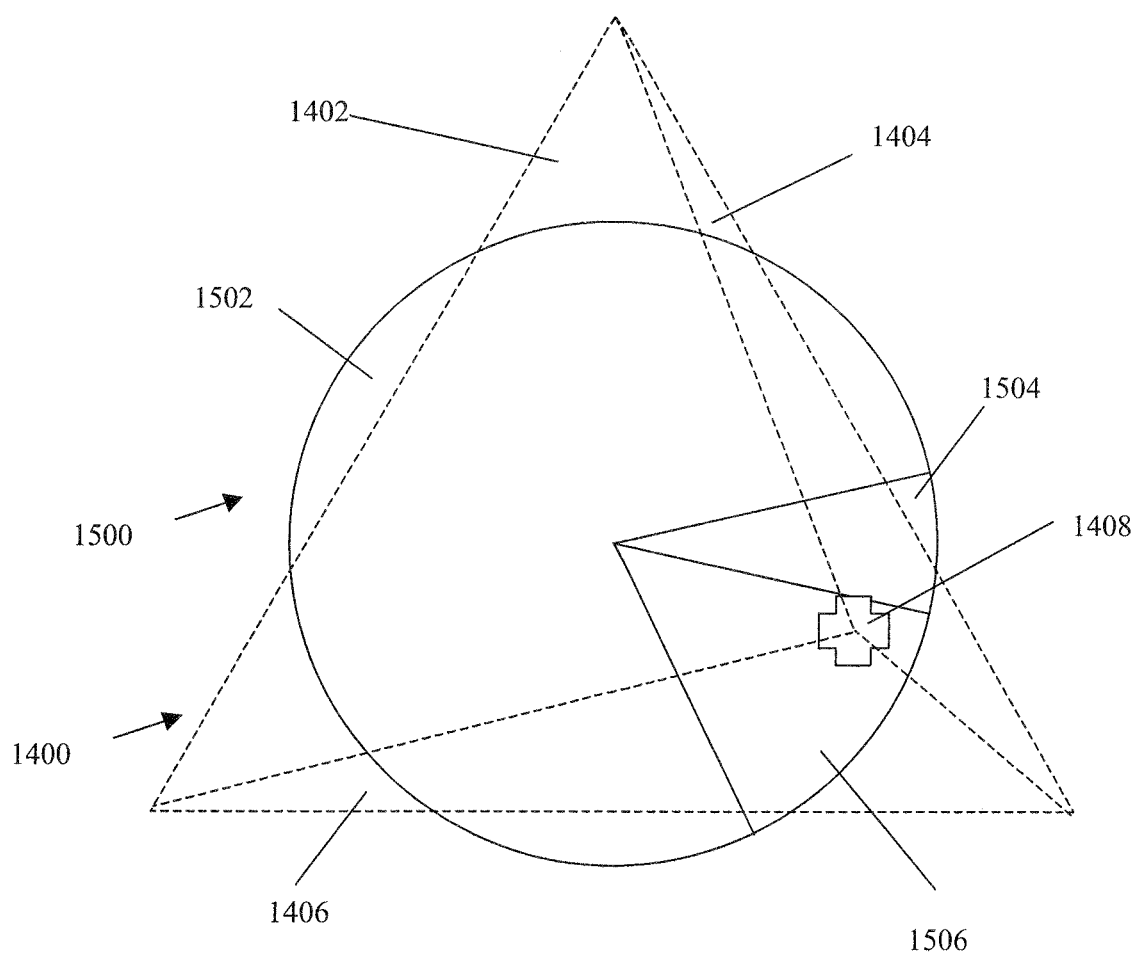
FIG. 16 is a schematic diagram of the control weight shape and display weight shape of FIG. 14 having a third set of control factor shape areas and display factor shape areas.

Reference is next made to FIG. 16, which illustrates control weight shape 1400 with the cursor 1408 positioned such that each of control factor shapes 1402, 1404, and 1406 has a different area. Each of the corresponding display factor shapes 1502-1506 have corresponding areas, reflecting the weight assigned to the corresponding metrics.

A control weight shape that is used in combination with a display weight shape may or may not be displayed to a user, as noted above. If the control weight shape is displayed, it may be overlaid (or underlaid) on the display weight shape, or it may be positioned apart from the display weight shape. If the control weight shape is not displayed it will typically, although not necessarily, be overlaid or underlaid on the display weight shape. Whether the control weight shape is displayed or not, it need not be aligned with the display weight shape in any particular way.

FIGS. 14-16 illustrate the use of a control weight shape 1400 to control the dimensions of display factor shapes in a display weight shape. In other embodiments, the display weight shape may have factor shapes that remain the same size and shape, but vary in another characteristic such as color or color intensity.

Figure 17:
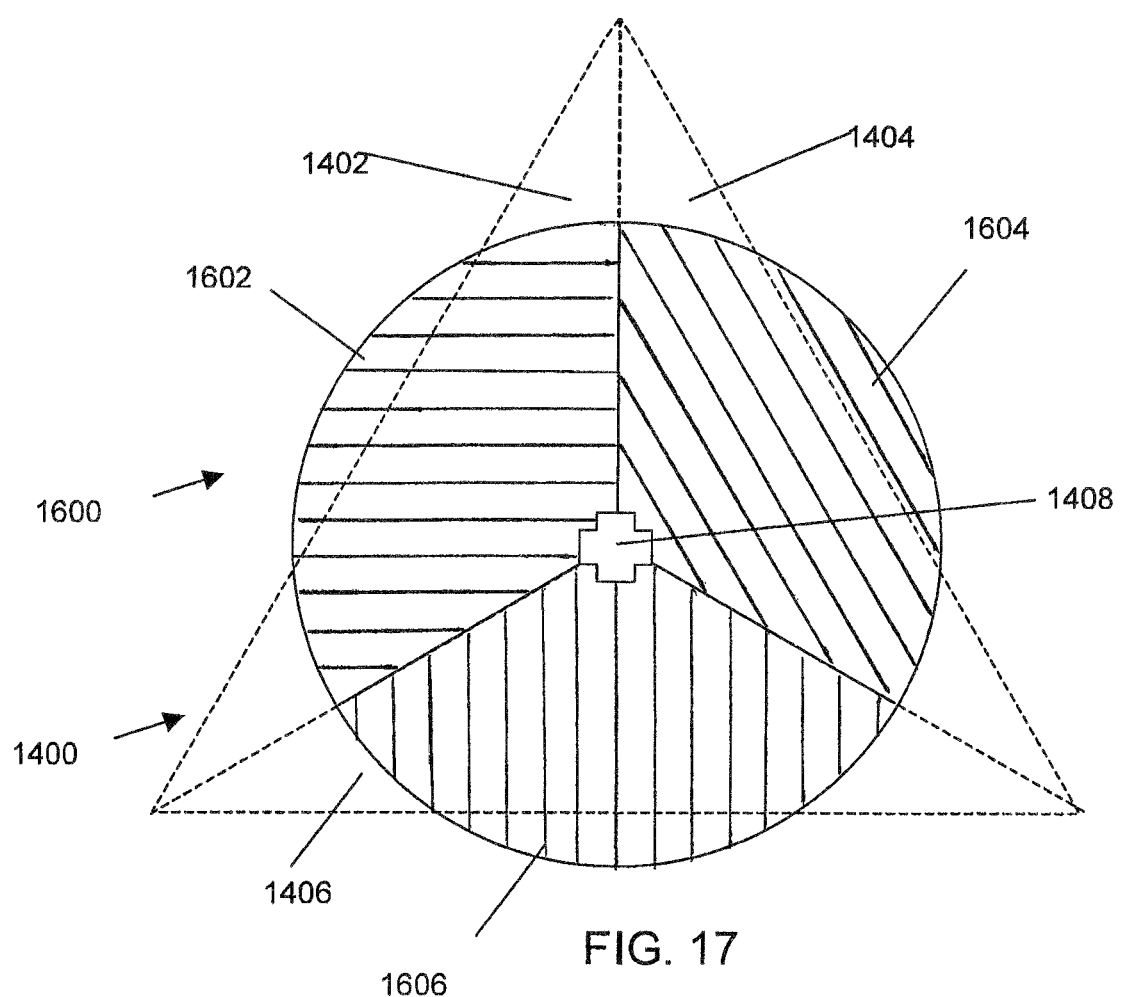
FIG. 17 is a schematic diagram of a second exemplary two-dimensional control weight shape and an exemplary two-dimensional display weight shape according to various embodiments.

Reference is next made to FIG. 17, which illustrates control weight shape 1400 and another exemplary display weight shape 1600 in the form of a circle. Display weight shape 1600 includes three display factor shapes 1602, 1604 and 1606, each of which is a sector of the circle. Together the three display factor shapes occupy the entire surface area of display weight shape 1600.

Each of the three display factor shapes 1602-1606 is displayed in a different color. In FIG. 17, this is illustrated by shading the three display factor shapes with different shading lines. Cursor 1408 is at the center of control weight shape 1400, indicating that the weights assigned to the three metrics associated with the control factor shapes 1402-1406 are equal. The illustrated display factor shapes have an equal color intensity as indicated by the equal spacing of the shading lines in each of the three display factor shapes.

Figure 18:
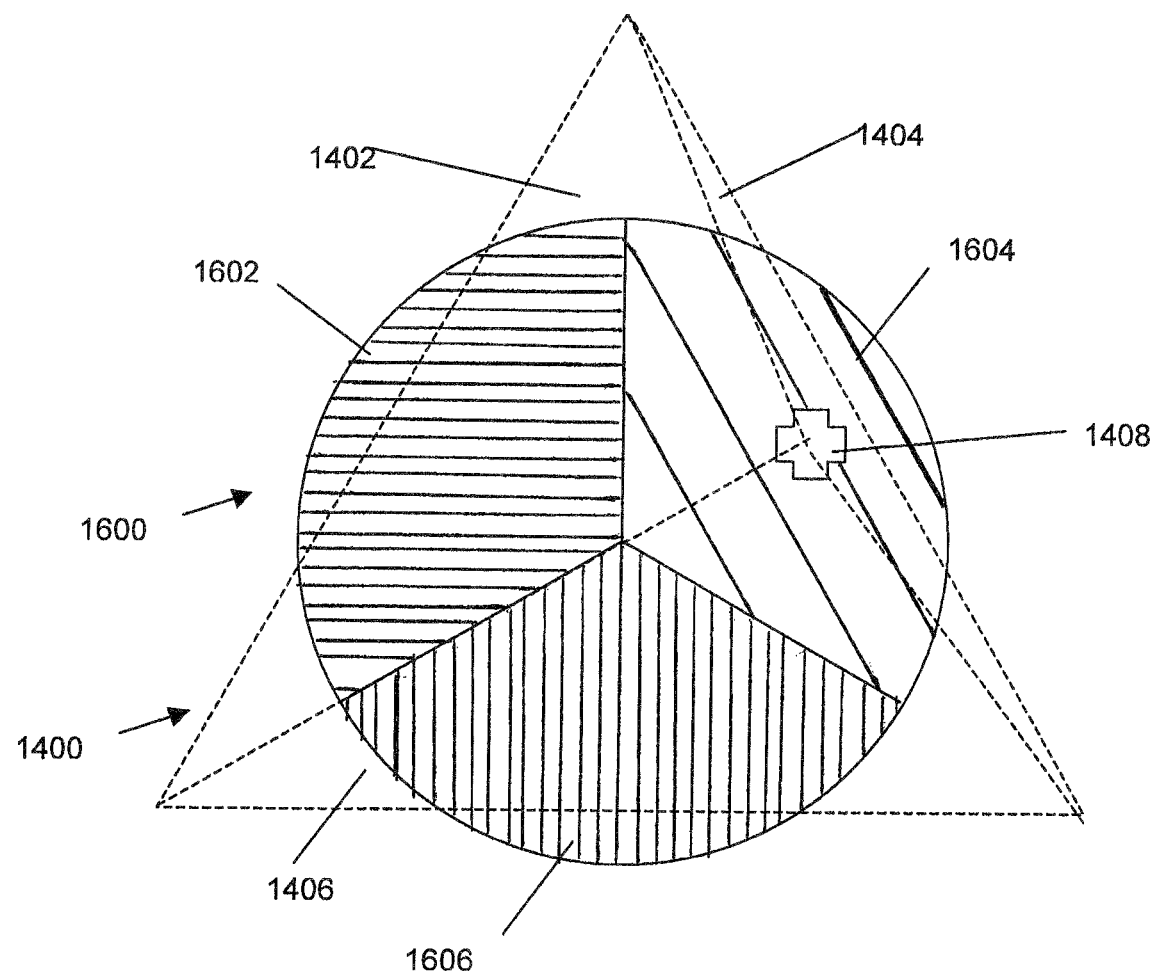
FIG. 18 is a schematic diagram of the control weight shape and display weight shape of FIG. 14 having a second set of control factor shape areas and display factor shape areas.

Reference is made to FIG. 18. As a user moves cursor 1408 within control weight shape 1400, the relative weights assigned to metrics associated with the control factor shapes 1402-1406 are varied. Each of the weights is converted into a color intensity. For each of the weights, the corresponding display factor shape 1602-1606 is displayed at the converted color intensity. In FIG. 18, the cursor has been moved to reduce the area of control factor shape 1404 and to increase the areas of control factor shapes 1402 and 1406. The spacing of shading lines in the display factor shapes indicates the change in weightings by denser shading in display factor shapes 1602 and 1606 and the sparser shading in display factor shape 1604.

In display weight shape 1600, the display factor shapes remain the same size. Changes in the relative weighting associated with the display factor shapes are illustrated by changing the color intensity (or density) of the display factor shapes. In this embodiment, each display factor shape is illustrated in a different color. In other embodiments, the display factor shapes may be the same color, allowing differences in color intensity to be more easily compared. In other embodiments, any variable display characteristic may be used to indicate the weight associated with each display factor shape. For example, shading lines with variable spacing may be used. In other embodiments a range of colors may be used to indicate a higher or lower weighting. For example, a range of colors between red and blue may indicate a range of weightings from 100% to 0%. Each display factor shape is displayed with a color corresponding to the weight of the corresponding metric or factor.

In FIGS. 17 and 18, control weight shape 1400 is display superimposed on display weight shape 1600. In other embodiments, the control weight shape may be used as shown, but may not be displayed to a user. In some embodiments, only the perimeter of the control factor shape may be displayed.

A control weight shape and display weight shape need not be of the same dimension. For example, if weights associated with four factors are to be controlled, a 3-dimensional control tetrahedron weight shape may be used in combination with a 2-dimensional display circle display shape. The display circle weight shape may have four sectors that vary in size (as in FIGS. 14-16) or in color intensity (as in FIGS. 17-18) to reflect the relative weights assigned to the different factors through manipulation of a cursor within the 3-dimensional control weight shape.

Referring to FIG. 4, the weight shape 400 may be considered to be both a control weight shape and a display weight shape. In embodiments where the cursor may be moved within the dimensions of the display weight shape, and where the display factor shapes are displayed in the same form in which the control factor shapes are determined, the control weight shape and display weight shape merge into one shape.

Generally, to independently control n factors, an n−1 dimension weight shape having n edges or surfaces of n−2 dimension, each of which can be associated with one of the factors, is employed. For example, in the case of 3 factors, a 2-dimensional triangle with three 1-dimensional edges can be used. In the case of four factors, a 3-dimensional tetrahedron having four 2-dimensional surfaces can be used. However, in some embodiments, weight shapes having a dimension of n−1 may be used to control more than n variables. For example, x variables, where x is greater than n may be controlled. In such embodiments, n of the variables may be controlled independently while the rest of the variables (i.e. x-n variables) may be expressed as a function of the n independent variables. In addition, in some embodiments, the user may be able to select, on the fly, which n variables are independent and which x-n variables are dependent on the remaining n variables. Furthermore, in some embodiments, the user may be able to select or specify appropriate relationships between the n independent variables and the x-n dependent variables.

Thus, by way of example, a two-dimensional weight shape may be used to control five variables. In this case, three of the variables will be independent and two will be dependent on the three independent variables. In addition, as described above, in some embodiments, the user may select, on the fly, which three variables are independent and which two are dependent.

In addition, it should be understood that n−1 dimensional weight shapes can be viewed by the user as a series of projections in dimensions lower than n−1. For example, a three-dimensional tetrahedron weight shape may be illustrated as a set of two-dimensional projections. One specific example of how this can be done is a set of four two-dimensional images. Each image can be a projection of the tetrahedron onto the plane of one of its sides. A similar method may be used for any weight shape of any given dimension.

While the various exemplary embodiments of the graphical function composition system 10 have been described in the context of object presentation management in order to provide an application-specific illustration, it should be understood that graphical function composition system 10 could also be adapted to any other application in which weighted combinations are calculated and the weights are constrained to a constant sum.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method of presenting a set of objects, the method comprising:
associating a plurality of at least three metrics with each object in the set of objects, each of the at least three metrics being a characteristic of a corresponding one of the objects;
for each object, calculating a metric factor for each of the metrics, each metric factor representing a relationship between the object and a corresponding one of the metrics;
selecting a control weight shape having one less dimension than the number of metrics, wherein a maximum number of dimensions for the control weight shape is three;
displaying a cursor movable within the control weight shape, said cursor constrained to move only within or on a defined constraint that is on or inside the weight shape, said cursor defining a point of convergence of a plurality of control factor shapes, wherein each of the control factor shapes corresponds to one of the metrics;
determining a weight for each metric based on the position of the cursor;
displaying a display weight shape having a plurality of display factor shapes, each of the display factor shapes corresponding to one of the metrics, wherein the appearance of each display factor shape is indicative of the weight assigned to the corresponding metric;
determining a weighted combination for each object in the set of objects, the weighted combination being based on the weight determined for each metric and the metric factor for each metric; and
arranging a display of at least some of the objects based on the weighted combinations.

2. The method of claim 1 wherein the control weight shape and the display weight shape are the same shape and wherein each of the control factor shapes corresponds to one of the display factor shapes, and wherein each of the corresponding control factor shapes and display factor shapes are the same shape.

3. The method of claim 1 wherein the control weight shape is displayed coincident with the display weight shape.

4. The method of claim 1 wherein the control weight shape is displayed together with the display weight shape.

5. The method of claim 1 wherein the control weight shape is not displayed.

6. The method of claim 1 wherein the control weight shape is displayed.

7. The method of claim 1 wherein there are three objects and three corresponding metrics, and wherein the control weight shape is a triangle having three edges, each edge corresponding to one of the metrics.

8. The method of claim 1 wherein the display weight shape is a circle having a display factor shape corresponding to each of the metrics.

9. The method of claim 1 wherein the area of each of the display factor shapes corresponds to the weight of the corresponding metric.

10. The method of claim 1 wherein the volume of each of the display factor shapes corresponds to the weight of the corresponding metric.

11. The method of claim 1 wherein the color of each of the display factor shapes corresponds to the weight of the corresponding metric.

12. The method of claim 1 wherein the intensity of each of the display factor shapes corresponds to the weight of the corresponding metric.

13. The method of claim 1 wherein the defined constraint has the form of any one of a line, curve, area, volume, surface, or combination of one or more areas, lines and curves.

14. A method of presenting a set of objects, the method comprising:
associating three metrics with each object in the set of objects, each of the three metrics being a characteristic of a corresponding one of the objects;
for each object, calculating a metric factor for each of the metrics, each metric factor representing a relationship between the object and a corresponding one of the metrics;
displaying a cursor movable within a control weight triangle, said cursor constrained to move only within or on a defined constraint that is on or inside the weight triangle, wherein the cursor defines a point of convergence of three control factor triangles, wherein each of the control factor triangles corresponds to one of the metrics,
determining a weight for each metric based on the position of the cursor;
displaying a display weight triangle having three display factor triangles, each of the display factor triangles corresponding to one of the metrics, wherein the area of each display factor triangle corresponds to the weight assigned to the corresponding metric;
determining a weighted combination for each object in the set of objects, the weighted combination being based on the weight determined for each metric and the metric factor for each metric; and
arranging a display of at least some of the objects based on the weighted combinations.

15. The method of claim 14 wherein the control weight triangle and the display weight triangle are identical and further including displaying the control weight triangle coincidentally with the display weight triangle, and wherein the display factor triangles converge at a point defined by the cursor.

16. The method of claim 14 wherein each side of the display weight triangle forms a base of one of the display factor triangles.

17. The method of claim 14 wherein the color of each of the display factor triangles corresponds to the weight of the corresponding metric.

18. The method of claim 14 wherein the intensity of each of the display factor triangles corresponds to the weight of the corresponding metric.

19. The method of claim 14 wherein the defined constraint has the form of any one of a line, curve, area, volume, surface, or combination of one or more areas, lines and curves.

20. A method of presenting a set of objects, the method comprising:
- associating four metrics with each object in the set of objects, each of the four metrics being a characteristic of a corresponding one of the objects;
- for each object, calculating a metric factor for each of the metrics, each metric factor representing a relationship between the object and a corresponding one of the metrics;
- displaying a cursor movable within a control weight tetrahedron, said cursor constrained to move only within or on a defined constraint that is on or inside the weight tetrahedron, wherein the cursor defines a point of convergence of three control factor tetrahedrons, wherein each of the control factor tetrahedrons corresponds to one of the metrics,
- determining a weight for each metric based on the position of the cursor;
- displaying a display weight shape having four display factor shapes, each of the display factor shapes corresponding to one of the metrics, wherein the appearance of each display factor shapes corresponds to the weight assigned to the corresponding metric;
- determining a weighted combination for each object in the set of objects, the weighted combination being based on the weight determined for each metric and the metric factor for each metric; and
- arranging a display of at least some of the objects based on the weighted combinations.

21. The method of claim 20 wherein the display weight shape is a display weight tetrahedron and wherein the display factor shapes are display factor tetrahedrons and wherein each surface of the display weight tetrahedron forms a base of one of the display factor tetrahedrons.

22. The method of claim 20 wherein the display weight shape is a display weight circle and wherein the display factor shapes are display factor sectors.

23. The method of claim 20 wherein the color of each of the display factor shapes corresponds to the weight of the corresponding metric.

24. The method of claim 20 wherein the intensity of each of the display factor shapes corresponds to the weight of the corresponding metric.

25. The method of claim 20 wherein the defined constraint has the form of any one of a line, curve, area, volume, surface, or combination of one or more areas, lines and curves.

* * * * *